(12) United States Patent
Blum et al.

(10) Patent No.: US 11,815,119 B2
(45) Date of Patent: Nov. 14, 2023

(54) PERFORATED WALL SYSTEM AND FASTENING ELEMENT

(71) Applicants: Franz Blum, Salzburg (AT); Martin Göckel, Epfenbach (DE)

(72) Inventors: Franz Blum, Salzburg (AT); Stefan Ilg, Nersingen (DE); Martin Göckel, Epfenbach (DE)

(73) Assignees: Franz Blum, Salzburg (AT); Martin Göckel, Epfenbach (DE)

( * ) Notice: Subject to any disclaimer, the term of this patent is extended or adjusted under 35 U.S.C. 154(b) by 1048 days.

(21) Appl. No.: 16/500,213

(22) PCT Filed: Apr. 4, 2018

(86) PCT No.: PCT/EP2018/058585
§ 371 (c)(1),
(2) Date: Oct. 2, 2019

(87) PCT Pub. No.: WO2018/185149
PCT Pub. Date: Oct. 11, 2018

(65) Prior Publication Data
US 2021/0115958 A1    Apr. 22, 2021

(30) Foreign Application Priority Data

| Apr. 4, 2017 | (DE) | .................... 10 2017 003 277.7 |
| Apr. 4, 2017 | (DE) | .................... 10 2017 003 278.5 |
| Jun. 27, 2017 | (DE) | .................... 10 2017 006 052.5 |
| Nov. 2, 2017 | (DE) | .................... 10 2017 010 206.6 |

(51) Int. Cl.
*F16B 1/02* (2006.01)
*F16B 21/02* (2006.01)

(52) U.S. Cl.
CPC ...................... *F16B 21/02* (2013.01)

(58) Field of Classification Search
CPC ........ F16B 5/10; F16B 5/0208; F16B 5/0642; F16B 21/02; F16B 21/04; F16B 19/109; B63B 21/04; E02B 3/24
See application file for complete search history.

(56) References Cited

U.S. PATENT DOCUMENTS

| 3,106,377 | A | | 10/1963 | Cotton | |
| 3,150,703 | A | * | 9/1964 | Preziosi | ................. F16B 21/02 411/908 |
| 4,457,650 | A | | 7/1984 | Tseng | |
| 4,966,392 | A | | 10/1990 | Featon et al. | |
| 5,199,836 | A | * | 4/1993 | Gogarty | ............... F16B 37/045 411/84 |

(Continued)

FOREIGN PATENT DOCUMENTS

| CN | 201568420 U | 9/2010 |
| CN | 204828199 U | 12/2015 |

(Continued)

*Primary Examiner* — Daniel J Wiley
(74) *Attorney, Agent, or Firm* — THE WEBB LAW FIRM

(57) ABSTRACT

Disclosed is a perforated wall system, having a perforated wall which includes a front side and a rear side and multiple openings in the perforated wall and at least one fastening element for fastening to the perforated wall. The fastening element includes an element body and a locking element provided on the element body for the releasable connection of the fastening element to the perforated wall at an opening in the perforated wall. The locking element projects through the opening in the perforated wall for the fastening of the fastening element.

21 Claims, 19 Drawing Sheets

(56) References Cited

U.S. PATENT DOCUMENTS

| | | |
|---|---|---|
| 5,702,218 A | 12/1997 | Onofrio |
| 5,752,591 A | 5/1998 | Beyer |
| 2004/0119277 A1 | 6/2004 | Girardin |
| 2005/0276677 A1 | 12/2005 | Andersson et al. |
| 2009/0074539 A1* | 3/2009 | Mahdavi ................. F16B 21/02 411/533 |
| 2009/0080999 A1* | 3/2009 | Dunn ...................... F16B 21/02 411/500 |
| 2011/0262243 A1* | 10/2011 | Glickman ............... F16B 21/02 411/347 |
| 2015/0023759 A1 | 1/2015 | Klopfenstein, II |
| 2016/0040705 A1 | 2/2016 | Peter et al. |

FOREIGN PATENT DOCUMENTS

| | | |
|---|---|---|
| CN | 105264241 A | 1/2016 |
| DE | 408450 | 1/1925 |
| DE | 1292966 | 4/1969 |
| DE | 7811198 U1 | 4/1978 |
| DE | 2719896 C3 | 3/1980 |
| DE | 4032865 C2 | 4/1992 |
| DE | 9215507 U1 | 1/1993 |
| DE | 9407340 U1 | 9/1994 |
| DE | 10114888 A1 | 10/2002 |
| DE | 10359226 A1 | 7/2004 |
| DE | 102006023028 B3 | 12/2007 |
| DE | 102012103815 A1 | 11/2012 |
| DE | 202015100175 U1 | 3/2015 |
| DE | 202017000226 U1 | 4/2017 |
| DE | 202017001788 U1 | 7/2017 |
| DE | 202017001799 U1 | 7/2017 |
| DE | 202017003358 U1 | 10/2017 |
| FR | 3014510 A1 | 6/2015 |
| GB | 972995 | 10/1964 |
| WO | 03095270 A1 | 11/2003 |
| WO | 2012099212 A1 | 7/2012 |

* cited by examiner

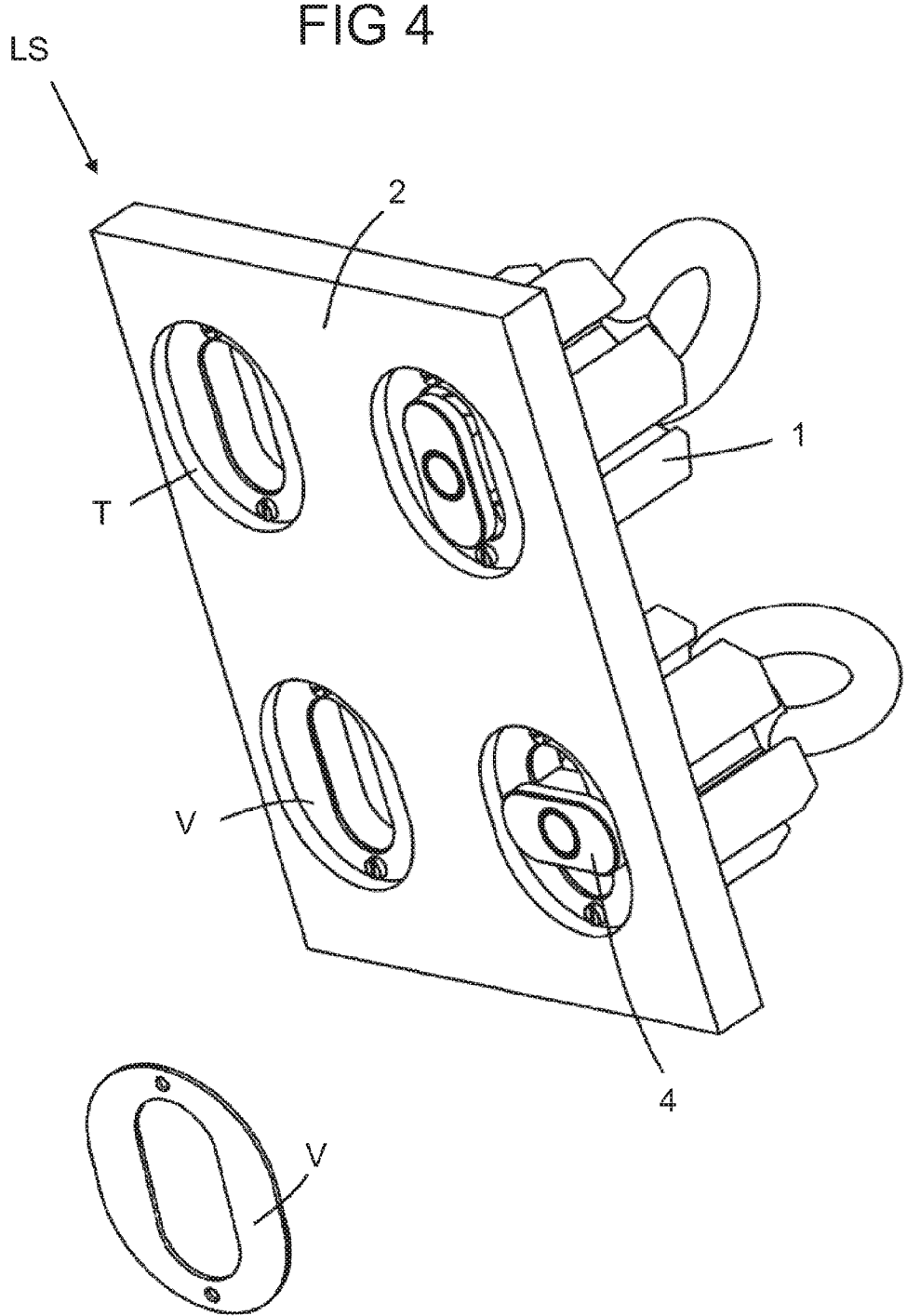

PERFORATED WALL SYSTEM AND FASTENING ELEMENT

CROSS-REFERENCE TO RELATED APPLICATIONS

This application is the United States national phase of International Application No. PCT/EP2018/058585 filed Apr. 4, 2018, and claims priority to German Patent Application Nos. 10 2017 003 278.5 filed Apr. 4, 2017, 10 2017 003 277.7 filed Apr. 4, 2017, 10 2017 006 052.5 filed Jun. 27, 2017, and 10 2017 010 206.6 filed Nov. 2, 2017, the disclosures of which are hereby incorporated by reference in their entirety.

BACKGROUND OF THE INVENTION

The proposed solution relates, in particular, to a perforated wall system and to a fastening element for a perforated wall system.

A perforated wall system, such as, for example, is disclosed in DE 20 2017 000 226 U1, comprises a perforated wall with multiple openings in the perforated wall, at each of which a fastening element is fixable in a variable manner. The possibility, which varies according to position, quantity and type, to utilize the perforated wall for fixing a fastening element has regularly required up to now an expensive design of the perforated wall itself so that fastening elements which match hereto can be hung or fixed in another manner.

SUMMARY OF THE INVENTION

There is consequently a need for a variable, easily mountable perforated wall system or a corresponding fastening element for a perforated wall system that is easy to mount.

Said object is achieved with a perforated wall system with features as described herein and with a fastening element with features as described herein.

A proposed perforated wall system provides, in this case, along with a perforated wall which comprises a front side and a rear side and multiple openings in the perforated wall, at least one fastening element for fastening to the perforated wall. The fastening element comprises an element body and a locking element provided on the element body for the releasable connection of the fastening element to the perforated wall at one of the openings in the perforated wall of the perforated wall. The locking element of the proposed perforated wall system projects, for the fastening of the fastening element, through the opening in the perforated wall. In addition, the locking element is rotatable and tensionable against the rear side of the perforated wall and the element body is tensionable against the front side of the perforated wall by an actuating element of the fastening element accessible at the front side of the perforated wall and/or the element body accessible at the front side of the perforated wall being actuated.

An actuation of the element body accessible at the front side of the perforated wall can serve, in this case, for example, for rotating the locking element so that the locking element inserted into the opening in the perforated wall and projecting through the opening in the perforated wall engages behind the perforated wall at the opening in the perforated wall. As an alternative to this, such a rotation can be achievable by actuating an actuating element of the fastening element accessible at the front side of the perforated wall. The tensioning of the locking element against the rear side of the perforated wall and the tensioning of the element body against the front side of the perforated wall can additionally be effected by means of the actuating element and/or the element body. The actuating element is provided, for example, for adjusting the locking element and the element body relative to one another. This involves, for example, as a result of rotating the actuating element, the locking element and the element body being moved closer to one another in order to clamp a portion of the perforated wall, which comprises the opening in the perforated wall, between the locking element and the element body and consequently to fix the fastening element to the perforated wall. The proposed solution additionally involves an actuation of the actuating element following or preceding an actuating of the element body, or both actuations being combined with one another in order (a) to rotate the locking element and to tension it against the rear side of the perforated wall and (b) to tension the element body against the front side of the perforated wall.

In an embodiment, the locking element engages behind the perforated wall at the opening in the perforated wall when the fastening element is fastened in the manner intended. The locking element is then in a locking position and cannot be removed from the opening in the perforated wall again without being rotated into an initial position. For example, the locking element has first to be rotated by 90° (about a center axis of the fastening element) out of the locking position into the initial position before the locking element can be removed out of the opening in the perforated wall again.

The locking element can comprise a shoulder which is received in the opening in the perforated wall and locks the locking element against rotation in the opening in the perforated wall by more than 90° (or another predetermined rotational angle). Accordingly, the locking element can then project through an opening in the perforated wall, for example by way of a portion and, after rotation, can engage behind the perforated wall at the opening in the perforated wall. In this connection, a shoulder of the locking element received in the opening in the perforated wall locks the locking element against rotation by more than 90° so that the locking element, inserted as intended into an opening in the perforated wall, is only ultimately pivotable at the perforated wall by a predefined angular range between an initial position and a locking position. In the locking position, for example, the locking element engages behind the perforated wall at the opening in the perforated wall and is then subsequently, for example as a result of rotation of the actuating element or of the element body, tensioned against the rear side of the perforated wall.

The shoulder, which delimits the rotation of the locking element in the opening in the perforated wall, comprises, for example, in an exemplary embodiment, an eye-shaped cross sectional area with two oppositely situated radii and two oppositely situated corners. The two oppositely situated radii consequently then define, for example, oppositely situated convex roundings which are connected together at the oppositely situated corners.

In a realization variant, the fastening element comprises a threaded bolt which comprises an external thread which engages with an internal thread of the locking element. The threaded bolt can be connected to the actuating element or to the element body so that by rotating the actuating element or by rotating the element body, the threaded bolt is rotatable and the locking element can be moved closer to the element body or moved away from the same. By moving the locking element closer to the element body or to a bottom side of the element body, the locking element can be tensioned against the rear side of the perforated wall and the element body against the front side of the perforated wall. The actuating element is connected to the threaded bolt, for example in a positive locking manner. In a realization variant, the actuating element is held pivotably on the threaded bolt.

As an alternative to this or in addition to it, the actuating element can be held so as to be rotatable in an indentation or recess of the element body by means of a portion. In a further development based hereon, a corresponding portion of the actuating element, which is held so as to be rotatable in an indentation of the element body, is realized, for example, as a pivot pin (portion).

In one realization variant, a threaded bolt, provided on the fastening element, on the one hand, can be rotatable together with the locking element so that the locking element can engage behind the perforated wall at the opening in the perforated wall (in order to secure the locking element which projects through the opening in the perforated wall against being able to be removed again from the opening in the perforated wall). On the other hand, the threaded bolt can be rotatable relative to the locking element in order to tension the locking element against the rear side of the perforated wall and the element body against the front side of the perforated wall. In said realization variant, a two-phase movement sequence is consequently realizable with the threaded bolt. When the fastening element is mounted at an opening in the perforated wall, the locking element is thus able to be rotatable initially via the threaded bolt in order to move the locking element, inserted into the opening in the perforated wall, into a locking position before a subsequent further rotation of the threaded bolt tensions the locking element, remaining in its locking position, against the rear side of the perforated wall and the element body against the front side of the perforated wall.

A spring ring, which engages in a groove of the locking element and is fixed on the threaded bolt, is provided, as an alternative to this or in addition to it, for releasing a fastening of the fastening element at the perforated wall. By means of the spring ring, the locking element, by rotating the threaded bolt, is entrained (from a locking position) into an initial position in which the locking element can be pulled out of the opening in the perforated wall from the front side of the perforated wall.

The opening in the perforated wall comprises, for example, the form of an elongated hole. The locking element can comprise, as an alternative to this or in addition to it, a cross section with variously long side lengths. For example, the locking element can comprise a rectangular cross section or a cross section in the form of an elongated hole.

In a realization variant, the element body comprises multiple T grooves and/or multiple bores for the fastening of an object and/or an attachment part to the element body. T grooves and/or bores provided on the element body can consequently serve for fastening further components of the perforated wall system, in particular of fitments, i.e. in particular furnishings, attachment parts and/or apparatuses of the perforated wall system. Already defined fastening places for further components of the perforated wall system and/or other attachment parts are consequently predefined and realized on the element body via the multiple T grooves and/or the multiple bores.

Multiple T grooves and multiple bores can alternate, in this case, on the element body along a circumference of the element body. Provided, for example, is a realization variant with an element body which is hexagonal in cross section where the bores are provided in the region of the corners of the hexagonal cross section with T grooves located in between.

In a realization variant, the element body comprises, on a bottom side facing the perforated wall, a recess at which the locking element protrudes from the element body. The recess is offset in relation to the perforated wall when the element body abuts as intended against the perforated wall in the region of the opening in the perforated wall. The recess on the bottom side of the element body means the fastening element can be usable, for example, for perforated walls with various wall thicknesses. A shoulder, which has been explained above and which delimits the rotatability of the locking element in an opening in the perforated wall, can thus still be received in the case of a thin-walled perforated wall at least in part in the recess provided on the bottom side of the element body, in particular when the shoulder does not fit fully into the opening in the perforated wall. If, for example, the wall thickness of the perforated wall is less than the height of the shoulder, the shoulder is still able to be received in part in the recess on the bottom side of the element body.

In a realization variant, the actuating element comprises a bracket part. Such a bracket part can be formed, for example, by a shackle or can include a shackle. As an alternative to this or in addition to it, the bracket part can include a ring nut or can be formed by a ring nut. In principle, the bracket part can serve for hanging attachment parts or straps, in particular tensioning straps. A proposed perforated wall system can thus be provided for securement of a transported item in a vehicle by means of at least one fastening element or multiple fastening elements. As an alternative to this or in addition to it, fitments can be fastenable to the perforated wall by means of the perforated wall system and the at least one fastening element.

In an embodiment, at least one elastic element which pretensions the actuating element against the element body is provided between a portion of the actuating element and a portion of the element body. The at least one elastic element can ensure, in this case, for example, that in the event of a force cooperating with the actuating element in operation, the fastening element does not result directly in further tensioning of the element body and of the locking element at the perforated wall or conversely in the release of the fastening of the fastening element at the perforated wall. If, for example, a (lashing) force applied by a tensioning strap cooperates with the actuating element, the at least one elastic element can prevent, in the case of a force coming from an unfavorable direction or a force pointing in a corresponding direction, the fastening element tightening excessively at the perforated wall and consequently making a release considerably harder or conversely the fastening element no longer tightening enough, as a result of which the fastening element is no longer able to hold sufficiently to the perforated wall.

The at least one elastic element can include, for example, a plate spring. In a further development based hereon, a spring assembly with multiple plate springs strung together is provided for pretensioning the actuating element against the element body.

In a realization variant, the fastening element comprises a display element by which the position of the locking element, which is not visible at the front side of the perforated wall after insertion into the opening in the perforated wall, is visually and/or haptically detectable at the front side of the perforated wall. In this way, a user is able to detect visually or haptically via the display element whether the locking element is situated, for example, in an initial position, in which the locking element is able to be removed again out of the opening in the perforated wall, or in a locking position in which the locking element engages (fully) behind the perforated wall at the opening in the perforated wall.

The display element can include, for example, a threaded bolt with transverse marking, a hammer-head screw or a slotted screw.

In a further development of the perforated wall system with a display element and threaded bolt, an elastic pressure element can be additionally provided on the element body, which elastic pressure element presses in a transverse direction, which extends transversely to its longitudinal extension direction of the threaded bolt (and to a center axis of the fastening element which coincides therewith), onto an external thread of the threaded bolt. The elastic pressure element ensures, in this connection, that when the element body is rotated, the locking element and the display element are rotated. The elastic pressure element consequently ensures that when the fastening element is fixed by means of the locking element, the display element is also rotated in order to display the correct position of the locking element in this manner. In a further development, a pressure screw, by means of which the force at which the elastic pressure element presses against the external thread of the threaded bolt is adjustable, can be provided on the element body in addition to the elastic pressure element.

In an embodiment, the display element closes off in a flush-mounted manner with an end face of the fastening element on which the multiple bores are provided. Such a flush-mounted closure of the display element is provided, for example, in the case of a particularly flat element body. Fastening of further components to the element body via the bores, and in particular at the end face, is not restricted as a result of the display element closing off in a flush-mounted manner. At the same time, however, the current position of the locking element remains visually and/or haptically detectable via the display element. For example, the display element can be realized in this context as a slotted screw, the head of which closes off with an end face of the element body in a flush-mounted manner.

In a realization variant, a connection piece, to which, in particular, a complete tensioning strap apparatus is fastenable, is provided on the fastening element. The connection piece provided on the fastening element is consequently set up and provided, in particular, for the fastening of a complete tensioning strap apparatus of the perforated wall system. At the same time, however, such a connection piece can also be realized and provided for the connection of further components and in particular further attachment parts.

In principle, the perforated wall system can include a tensioning strap apparatus with a windable tensioning strap. Such a tensioning strap apparatus can comprise, for example, a mechanically, electrically or hydraulically operated ratchet mechanism. By means of the fastening element, a corresponding tensioning strap apparatus can consequently be fixed to the perforated wall without a large amount of assembly expenditure so that the tensioning strap apparatus is then utilizable subsequently for securing transported items to the perforated wall.

In principle, the perforated wall can form part of a ceiling paneling and/or a wall paneling of a vehicle.

A further aspect of the proposed solution relates to a fastening element for fastening to a perforated wall.

The proposed fastening element comprises, in this connection, an element body and a locking element provided on the element body and protruding from a bottom side of the element body for releasably connecting the fastening element to the perforated wall at an opening in the perforated wall. The locking element is set up, in this connection, for the fastening of the fastening element, to project through the opening in the perforated wall and to protrude from a rear side of the perforated wall. In addition, the locking element of the proposed fastening element is rotatable and tensionable against the rear side of the perforated wall and, furthermore, the element body is tensionable against the front side of the perforated wall by an actuating element of the fastening element accessible at the front side of the fastening element and/or the element body being actuated, in particular rotated.

Realization variants of a proposed fastening element can be used, in particular, in realization variants of a proposed perforated wall system corresponding to the explanations provided above and below. Advantages and features explained above and below which apply to realization variants of a proposed perforated wall system also apply accordingly to realization variants of a fastening element used herein and vice versa.

For example, a fastening element can be provided for fastening to a perforated wall which forms part of a floor paneling, a wall paneling or a ceiling paneling of a vehicle. As an alternative to this or in addition to it, a fastening element can be provided for fastening a bracket part, a tensioning strap apparatus and/or a fitment to the perforated wall.

BRIEF DESCRIPTION OF THE DRAWINGS

The accompanying figures illustrate as examples possible realization variants of the proposed solution, in which:

FIGS. 1 to 7B show various views of a first set of realization variants of a proposed perforated wall system and of a proposed fastening element;

DESCRIPTION OF THE INVENTION

FIGS. 1 to 28 show various views of different realization variants of a proposed perforated wall system LS with realization variants of a proposed fastening element 1, by means of which objects, in particular loaded items and mobile fitments, are able to be fastened and fixed individually, for example in transport vehicles. In this connection, individual aspects of the different realization variants are easily able to be combined together. In particular, aspects of the three sets of realization variants according to FIGS. 1 to 7B, 8 to 14 and 15 to 25 are combinable together and are interchangeable.

Figure 1:
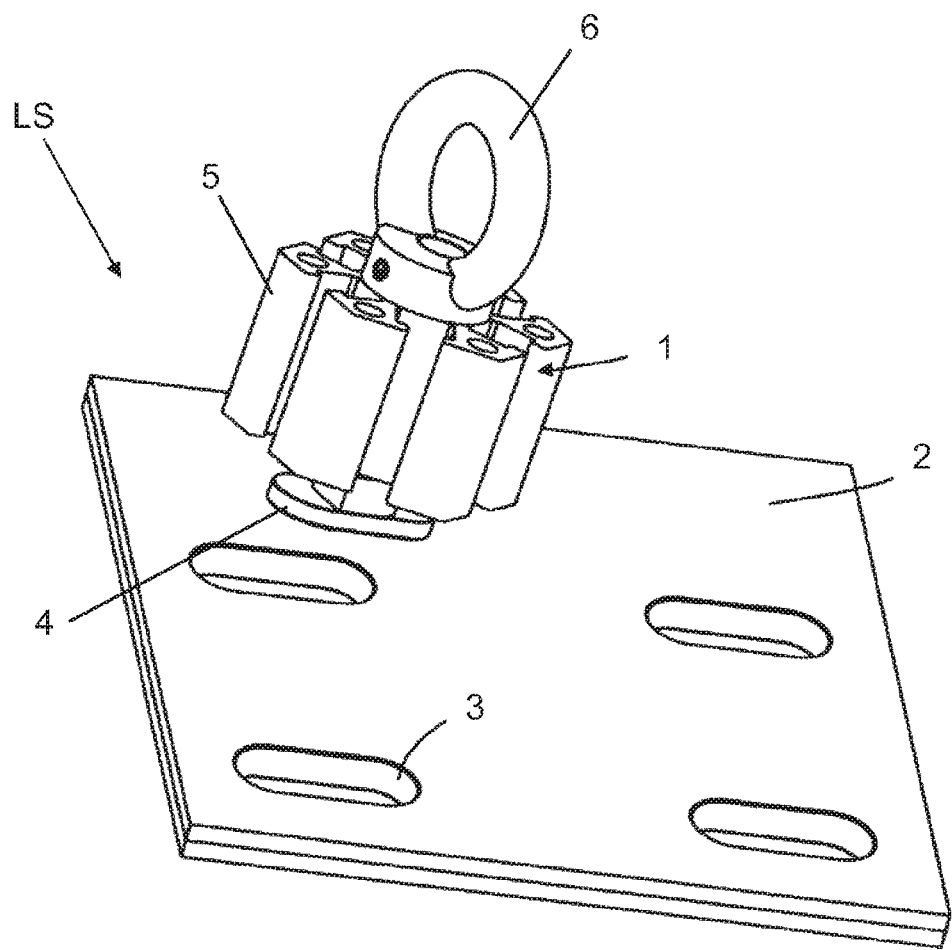

FIGS. 1 to 7B show a fastening element 1 for a perforated wall system LS, where openings 3 in the perforated wall can comprise, in principle, any types of geometric cross sections and the fastening element 1 can be fixed in the opening 3 in the perforated wall, as is shown, for example, in FIG. 1. The perforated wall 2 can be used, for example, in transport vehicles, it being possible to use the perforated wall 2, however, not only as wall paneling but also as floor or ceiling paneling.

The fastening element 1 is designed such that a fixed and releasable connection to the perforated wall 2 is able to be produced as a result of simple insertion and rotation in the respective opening 3 in the perforated wall. In this case, the fastening element 1 comprises a movable part 4 which in form and dimensions makes it possible to utilize the opening 3 in the perforated wall for fastening purposes. The movable part, a so-called locking element 4, fits in a positive locking manner into an opening 3 in the perforated wall and can be moved, once inserted into the opening 3 in the perforated wall, into a position which no longer allows it to be removed out of the opening 3 in the perforated wall (cf. FIGS. 3A-3C and 4 also). The movement of the locking element is a rotation in this connection.

The locking element 4 comprises a geometric cross section which comprises variously long side lengths, as in the case of a rectangle or an elongated hole. As an example, the locking 4 comprises a region between the long sides of an elongated hole geometry 3L which, as a result of two oppositely situated radii R1 and two oppositely situated corners E, permits a rotation of no more than 90° and only in one direction, cf. in particular FIGS. 3A to 3C. The fastening element 1 is consequently inserted so far through the perforated wall 2 with its locking element 4 that it is possible to displace or rotate the locking element 4 in relation to the geometry of the opening 3 in the perforated wall. Rotation by 90° then prevents the locking element 4 being able to be pulled out of the opening 3 in the perforated wall.

The locking element 4 is able to rotate into a region which lies in a milling groove or milled pocket T on the rear side of the perforated wall 2 (cf. FIG. 4). In this connection, a reinforcement plate V, which reinforces the material and distributes and absorbs the forces better, can be introduced into the milled pocket T. The reinforcement plate V, inserted into the pocket T, is fixed, for example, by way of at least one screw. The reinforcement plate V reinforces the material of the perforated wall 2 or a perforated floor so that the locking element 4 cannot press in at a support surface A, even in the case of a larger load, and the forces are distributed better. A higher level of stability is provided as a result.

An element body 5 of the fastening element 1, on which the locking element 4 is provided, is penetrated by a threaded bolt 7 which is connected at a top side to a ring nut 6 by way of transverse pin 7A and at the bottom side to the locking element 4 in a threaded bore 13. In other words, the threaded bolt 7 passes through the element body 5 and ends at an actuating element, here in the form of the ring nut 6. By turning the ring nut 6, the threaded bolt 7 rotates into the locking element 4 and consequently tensions the locking element 4 against the rear side of the perforated wall 2 and the element body 5 against the front side of the perforated wall 2.

Figure 2:
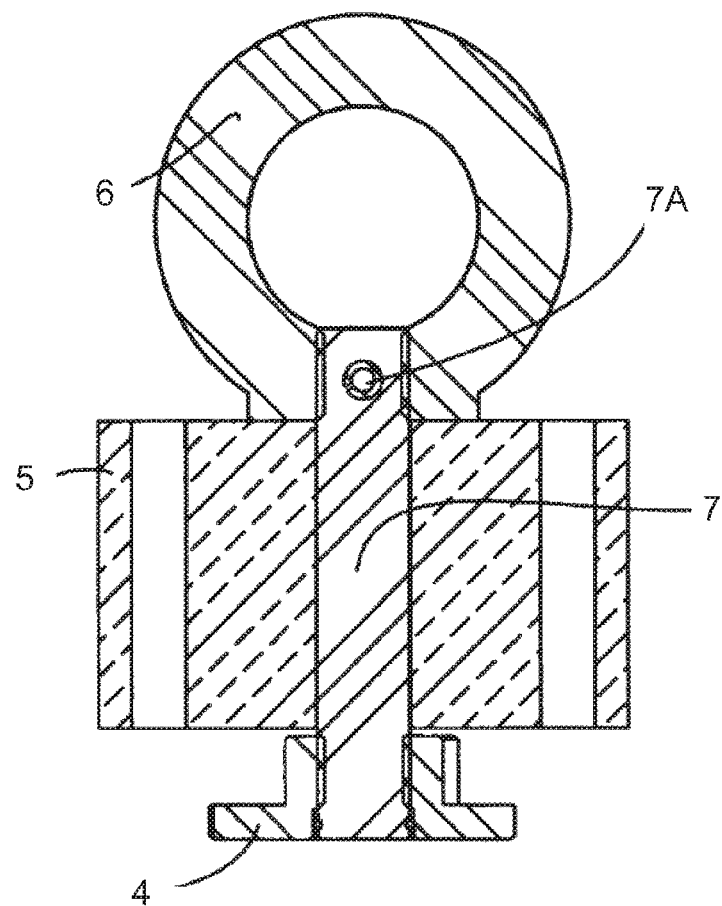
Figure 2A:
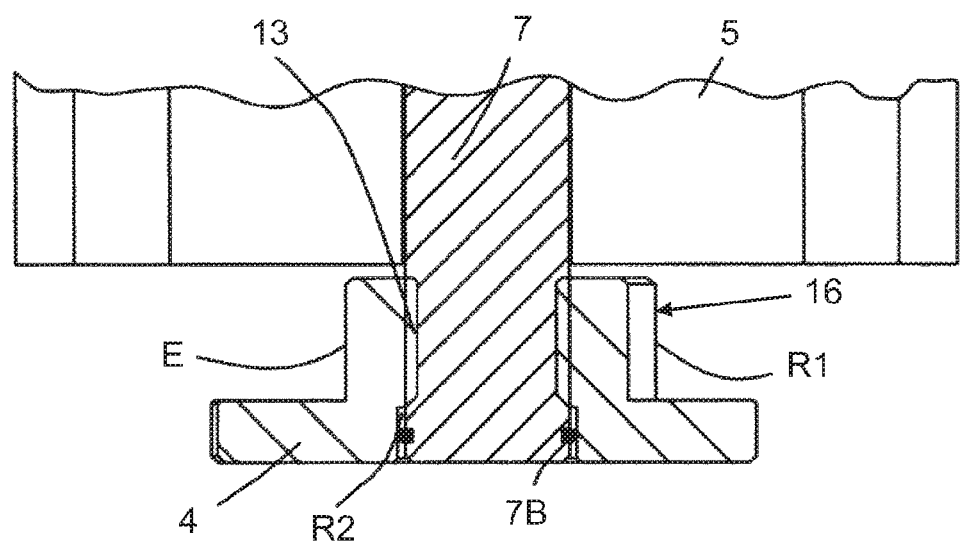
Figure 3A:
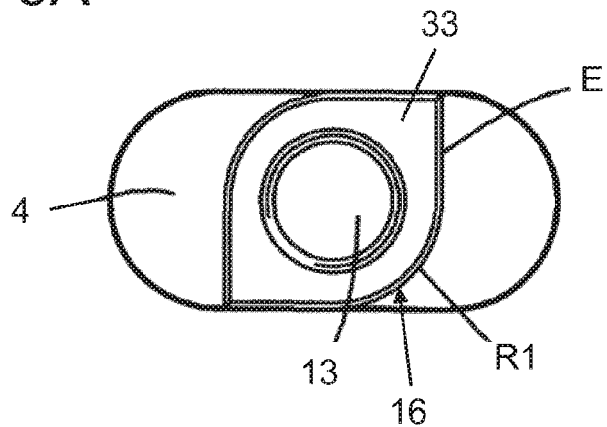
Figure 3B:
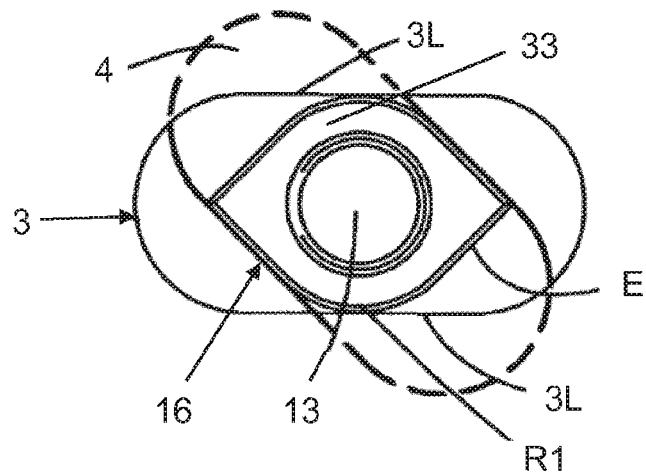
Figure 3C:
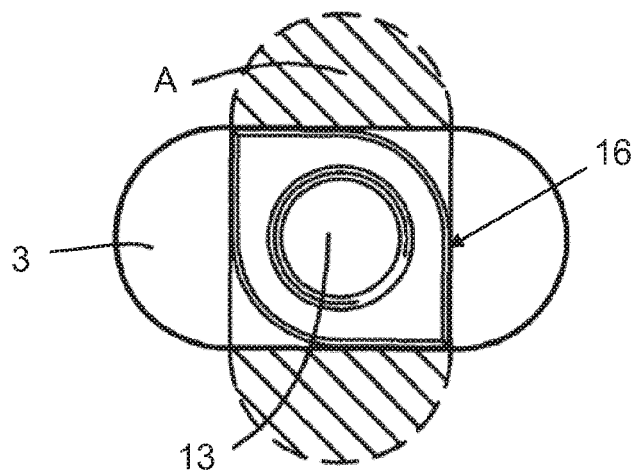

At one end, the threaded bolt 7 additionally comprises a spring ring 7B in a groove (cf. in particular FIGS. 2 and 2A), which reliably entrains the locking element 4 in a rearward rotational movement, when releasing the connection, and moves it to an initial position which makes it possible to remove the fastening element 1 from the perforated wall 2 (cf. FIGS. 3A to 3C also). When releasing the connection, the ring nut 6 is rotated in the opposite direction to a direction of insertion. The tension is released and the locking element 4 continues to rotate into the initial or insertion position. The spring ring 7B, which is inserted in the groove in the threaded bolt 7, causes the locking element 4 to rotate with the threaded bolt 7. The threaded bore 13 of the locking element 4 is enlarged in the region of the spring ring 7B as the spring ring 7B has a larger diameter or radius R2 than the threaded bore 7. The central threaded bore 13 of the locking element 4 consequently comprises, in the realization variants shown, a region which corresponds almost to an outside diameter of the spring ring 7B inserted into the groove on the threaded bolt 7 and, as a result, causes not only the entrainment of the locking element 4 during the rearward movement but also makes the locking element 4 captive.

The fastening element 1 can be used, for example, on the floor and serve as a movement locking element. For example, a relatively heavy transported item can be placed on the floor of a vehicle, for example of a transporter, and then be moved against one or multiple fastening elements 1 fastened in each case in a respective opening 3 in the perforated wall of the perforated wall 2 that is located on the floor. Further fastening elements 1 are introduced in openings 3 in the perforated wall on the other side of the transported item. It is then possible to lash the transported item by means of tensioning straps. During braking, the transported item is secured against slipping by the fastening elements 1, against which the transported item abut.

Figure 5:
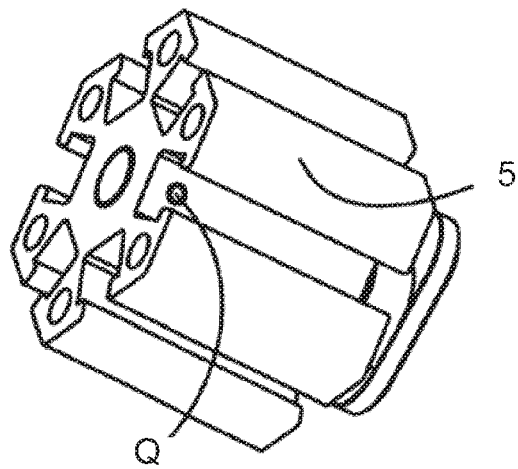
Figure 5A:
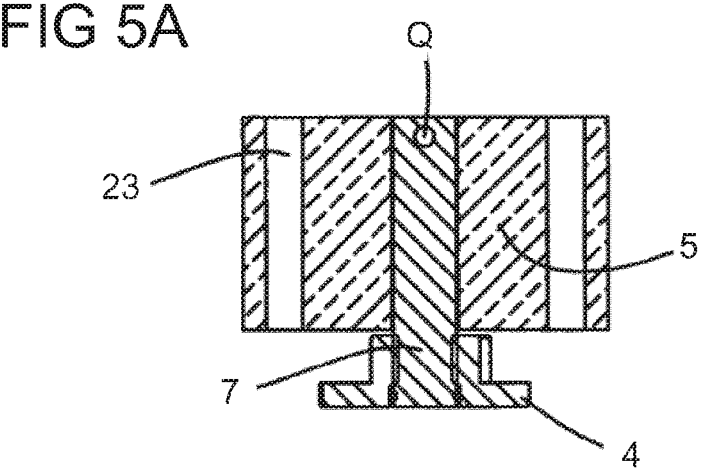
Figure 6:
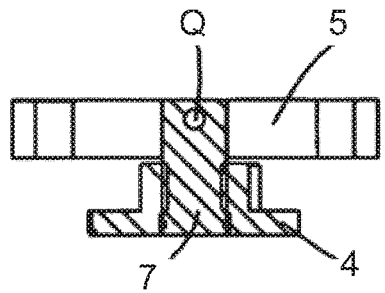

In realization variants shown by way of FIGS. 5, 5A and 6, a fastening element 1 does not comprise a ring nut 6 which is connected to the threaded bolt 7 by way of a transverse pin 7A. Rather, here the threaded bolt 7 is connected directly to the element body 5 of the fastening element 1 by means of transverse pin Q. As a result, once inserted into the opening 3 in the perforated wall, the fastening element 1 is fixable directly by rotating the element body 5.

Further objects or adapter plates can then be fastened to the element body 5 by means of the (threaded) bores 26. The element body 5 can be realized with an arbitrary length and consequently can be adapted in particular to the transported item. Thus, the realization variant in FIG. 6, as an example, does not comprise any cylindrical element bodies 5 but rather a flatter, for example compared to the variants in FIGS. 5 and 5A, disk-like element body 5.

Figure 7A:
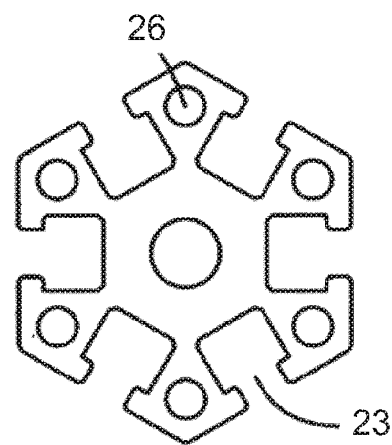
Figure 7B:
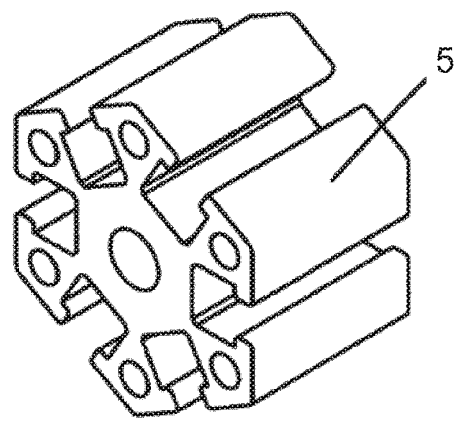
Figure 8:
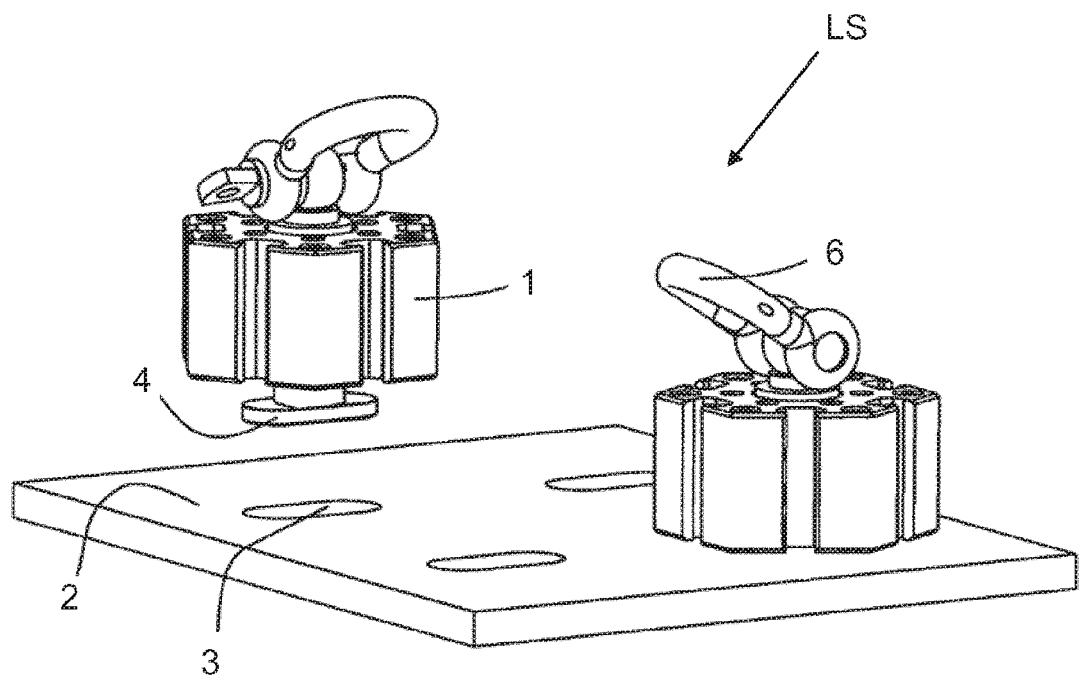
FIGS. 8 to 14 show a second set of realization variants of a proposed perforated wall system and of a proposed fastening element.
Figure 9:
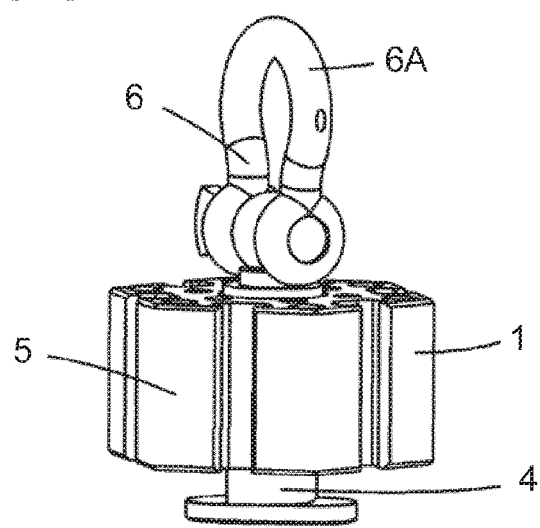

In principle, the element body 5 shown individually in FIGS. 7A and 7B can be formed by a drawn profile, for example an aluminum profile, with a round or angular cross section, in particular with a hexagonal cross section. The element body 5 and, in particular, such a profile can comprise, in the longitudinal direction, T grooves 23 and bores 26 on an end face of the fastening element 1, on which adapter plates, expansions and extensions can be mounted. The T grooves 23 can be utilized, in this connection, as fastening options for additional expansions and extensions by means of T groove nuts or T groove slots. Apart from this, the bores 26 can also be provided with threads.

Figure 10:
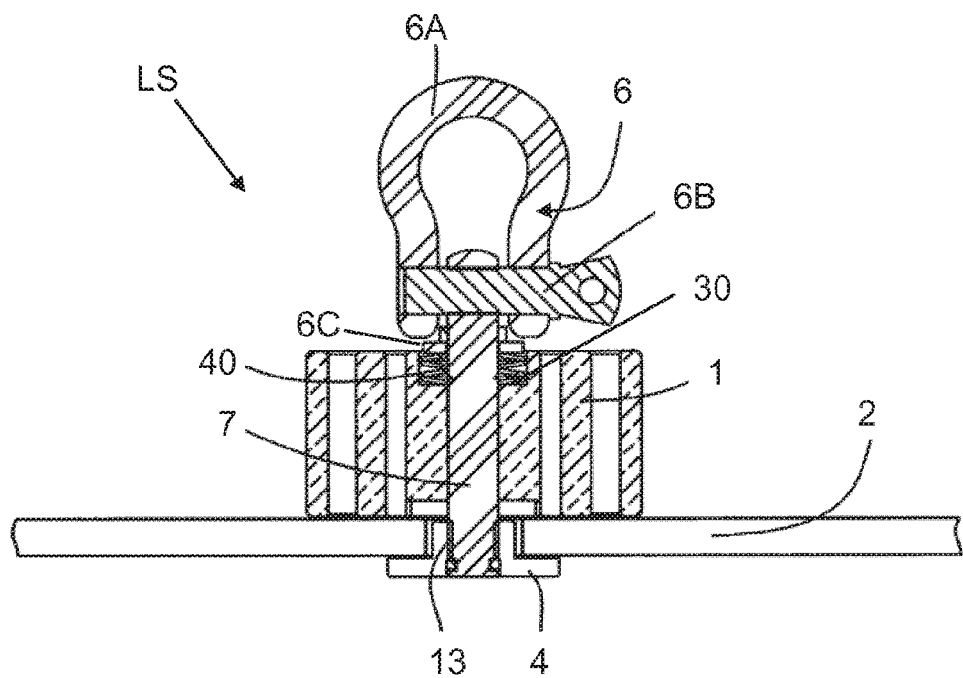
Figure 11:
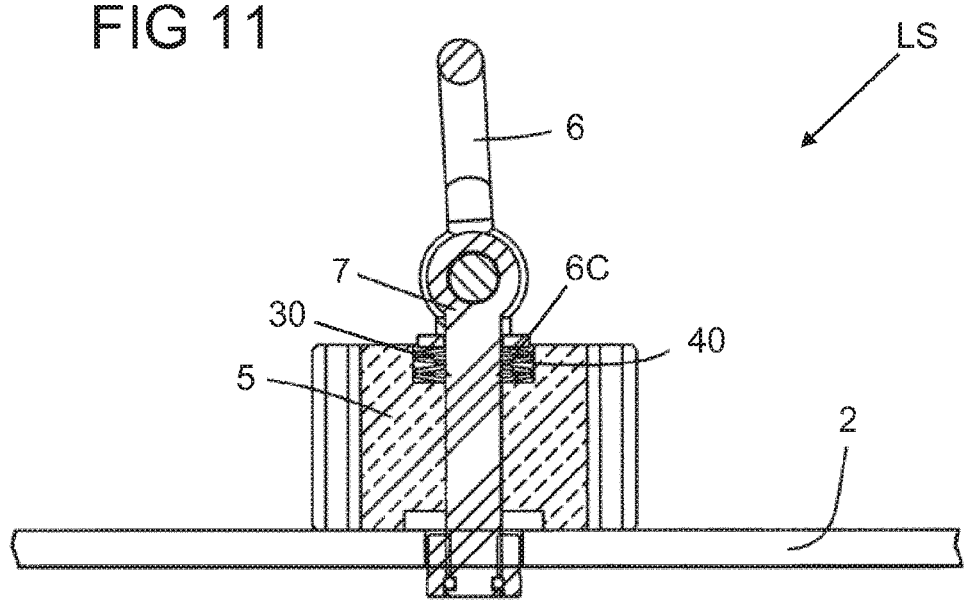
Figure 12:
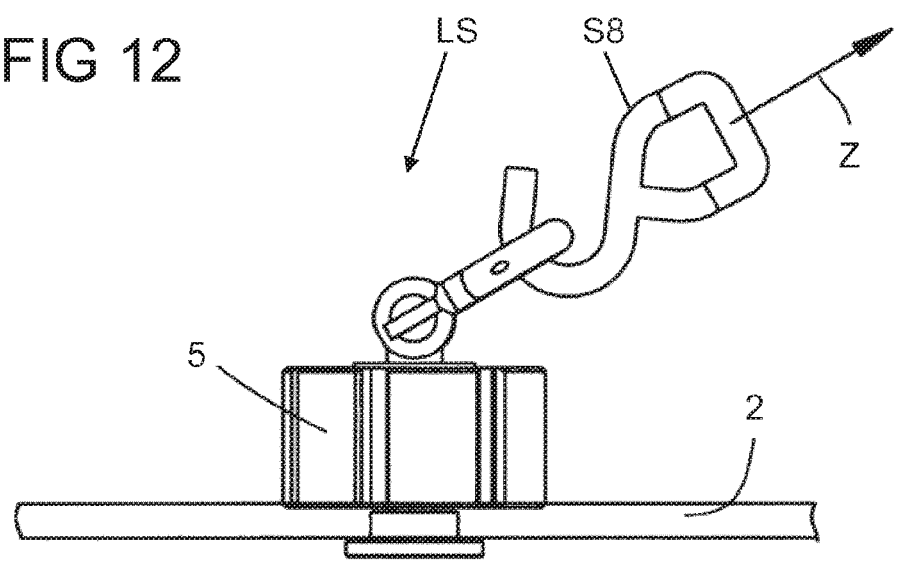
Figure 13:
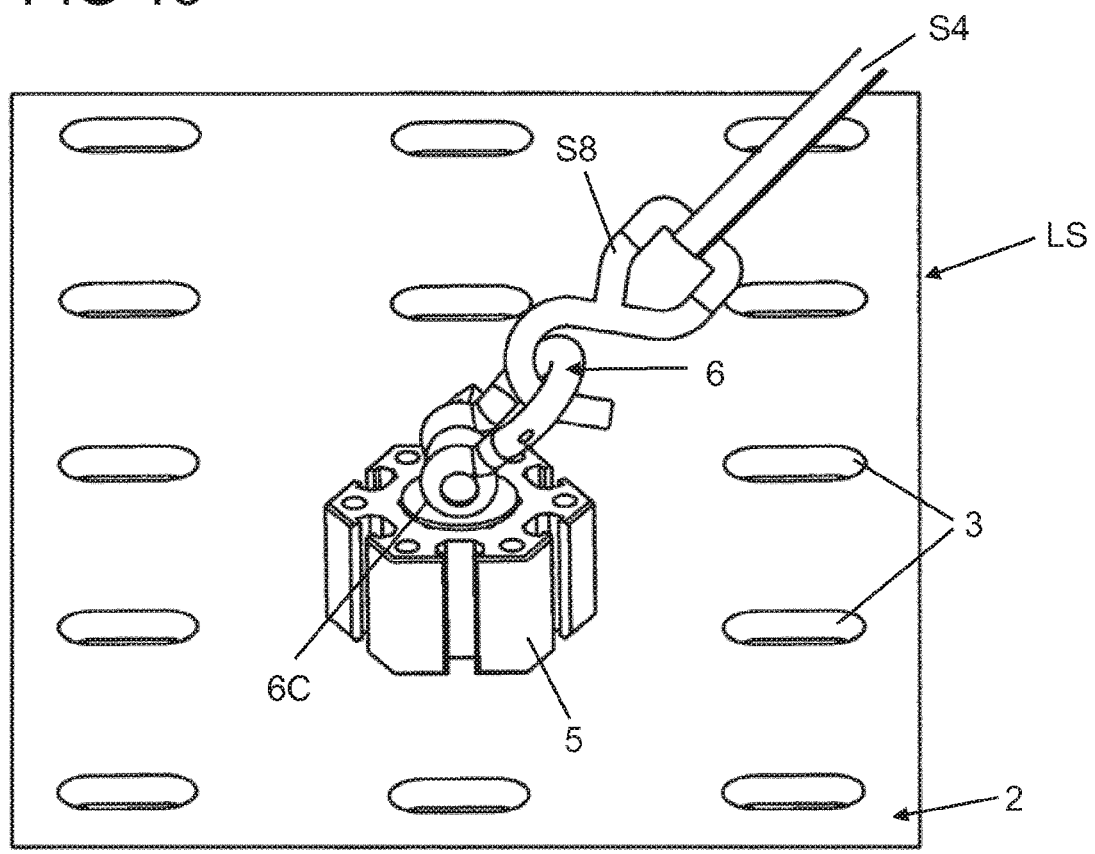
Figure 14:
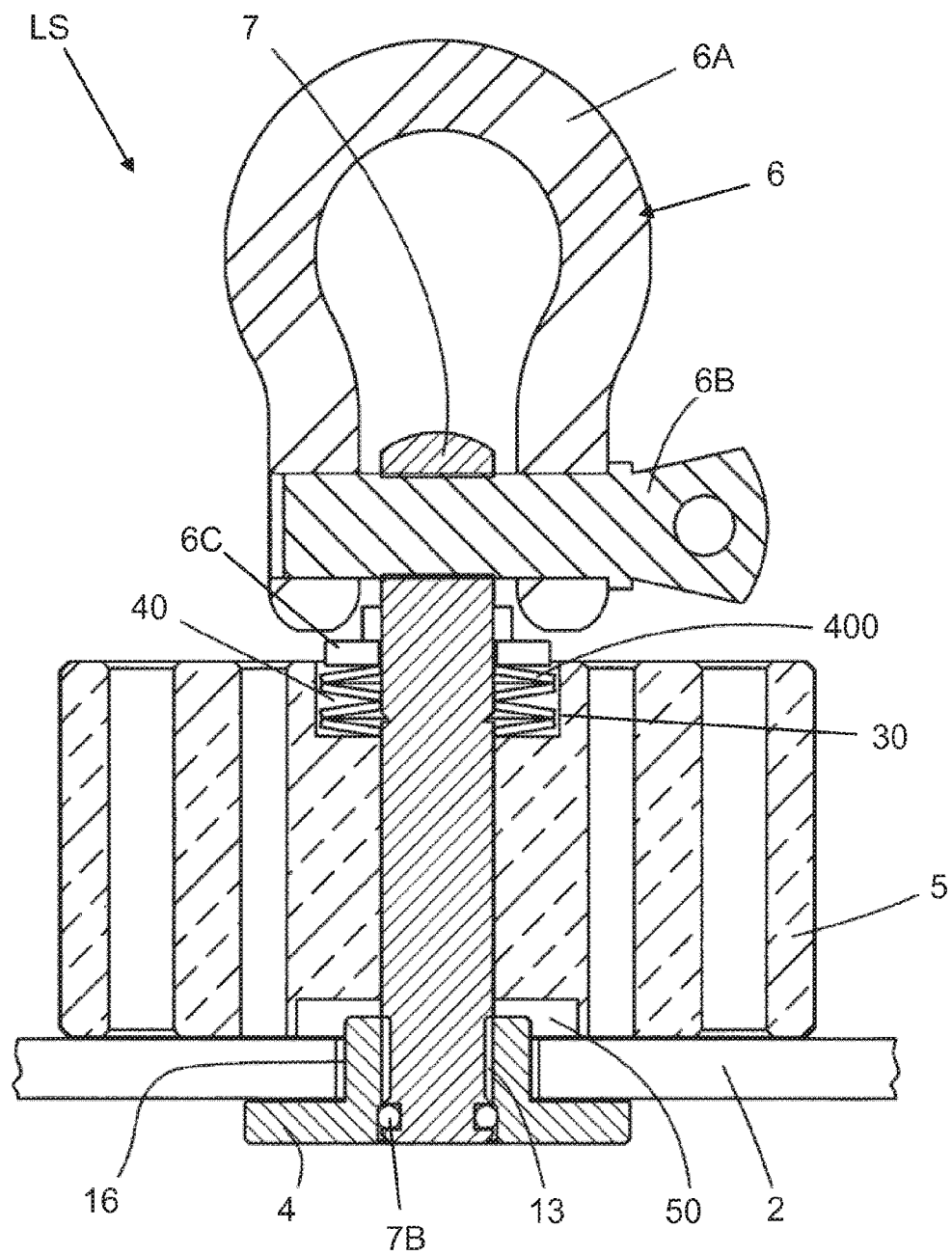

In the case of the realization variants in FIGS. 8 to 14, the threaded bolt 7 is realized as an eyebolt (cf. in particular FIGS. 10 and 14). The threaded bolt 7 also passes once again, in this connection, through the element body 5 and ends, at the front side of the actuating element 1, at an actuating element 6, which is connected in a positive locking manner to the threaded bolt 7 (cf. in particular FIG. 11). The actuating element 6 can comprise the form of a ring or eyelet, each of which can have a closed or partially open form.

As a result of the rotating of the actuating element 6, the threaded bolt 7, which is realized as an eyebolt, is also rotated in said realization variant into the locking element 4 and consequently tensions the locking element 4 against the rear side of the perforated wall 2 and the element body 5 against the front side of the perforated wall 2 (cf. for example FIG. 10). The element body 5, in the present case, comprises, on its bottom side from which the locking element 4 protrudes, a recess 50 into which the locking element 4 by way of its shoulder 16 is able to project when the thickness of the perforated wall 2 is less than the dimension of the shoulder 16, as can be seen, in particular, from FIG. 14.

The actuating element 6, in the present case, is movable in two directions so that the actuating element 6 can be adapted to the direction from which, for example, a lashing force Z comes which is exerted by a tensioning strap S4 which is hung on the actuating element 6 by means of a hanging device S8 (cf. FIGS. 12 and 13). For this reason, the actuating element 6 is provided, for example, with a commercially available shackle. Such a (commercially available) shackle comprises a bracket part 6A and is connected to the eyebolt by a transverse bolt 6B so that the shackle is able to be replaced quickly and simply when required (cf. for example FIGS. 10, 11 and 14).

Should then the lashing force Z come from an "unfavorable" direction, it is possible that the fastening element 1 tightens excessively to the perforated wall 2 and, as a result, makes a release very difficult or does not tighten sufficiently and, as a result, does not comprise sufficient hold. Provided for this purpose is an elastic element, for example in the form of an elastic assembly, in particular in the form of a spring assembly 40 consisting of one or multiple plate springs 400, which has set pretensioning and a sufficient tightening distance so that after tightening the optimum direction at optimum hold is settable within one full revolution (cf. FIG. 13). A certain tightening force and a certain elastic tightening distance can be preset, in this connection, as a result of the number and arrangement of the plate springs 400.

The spring assembly 40 is situated, for example, in an indentation or depression 30 on the top side of the element body 5 along the (longitudinal) axis of the threaded bolt and is consequently as good as invisible (cf. in particular FIG. 14). The spring assembly 40 is supported at the one end in the indentation 30 and at the other end on a support portion 6C assigned to the actuating element 6.

A fastening element in FIGS. 8 to 14 can consequently be introduced into an opening 3 in the perforated wall, the locking element 4 and the element body 5 each being able to be tightened against the perforated wall 2 as a result of subsequent rotation of the actuating element 6. The elastic element 40 of the fastening element in FIGS. 8 to 14, in this case, has set pretensioning and a sufficient tightening distance so that an almost constant tightening force is set within one full revolution of the actuating element 6.

A fastening element 1 with a display element is provided in the realization variants in FIGS. 15 to 25. By means of such a display element, the precise position of the locking element 4 in relation to the opening 3 in the perforated wall is visible to the user and, where applicable, is also palpable in the dark through touch with a finger at any time after the locking element 4 has been inserted into an opening 3 in the perforated wall. In this case, it is possible, in particular, for the user to detect at the front side of the perforated wall 2 whether the locking element 4 is situated in the optimum position, that is to say the position in which the longitudinal side of the locking element 4 is perpendicular to the longitudinal side of the opening 3 in the perforated wall (cf. for example FIGS. 22A and 22B).

Figure 15:
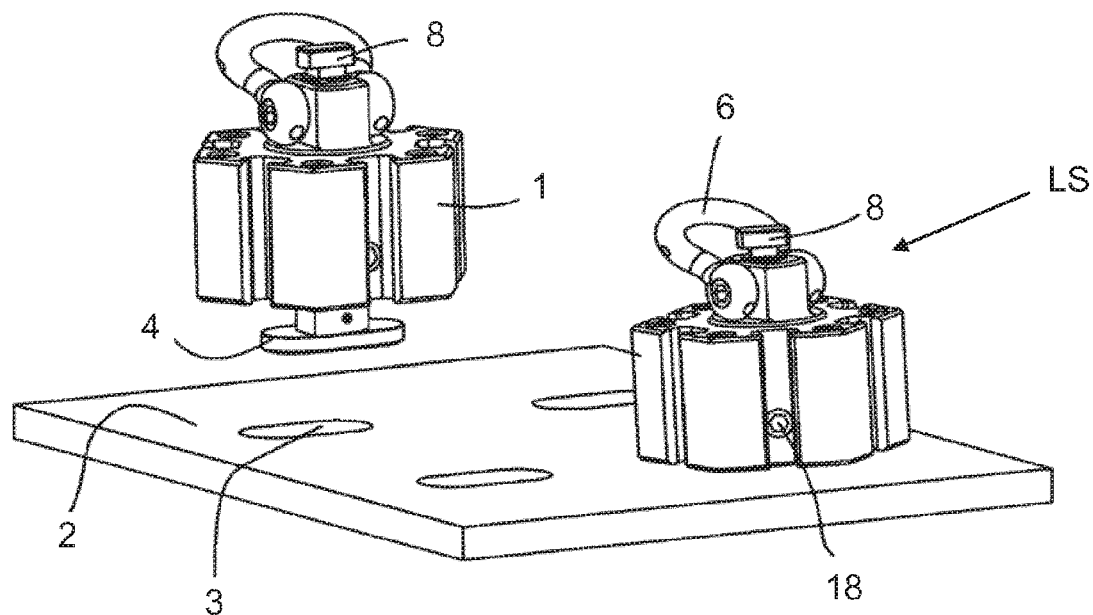
FIGS. 15 to 25 show a third set of realization variants of a proposed perforated wall system and of a proposed fastening element.
Figure 16:
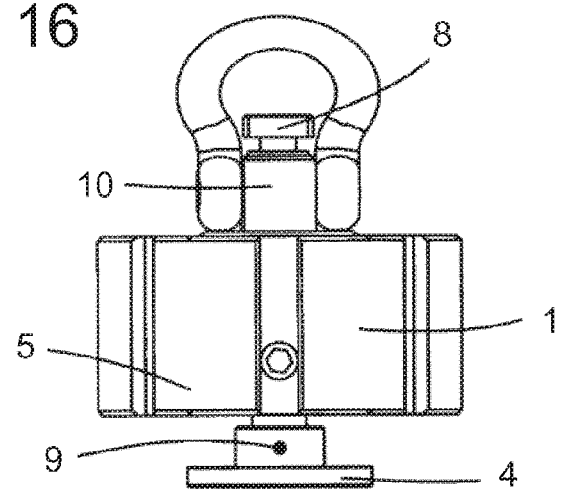
Figure 17:
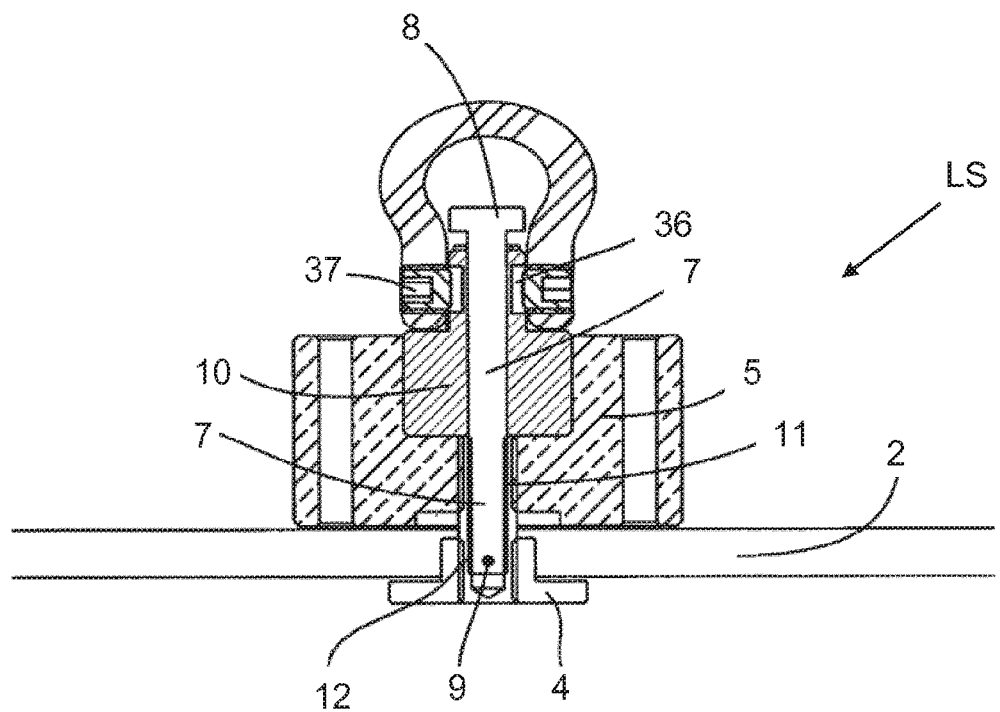
Figure 20:
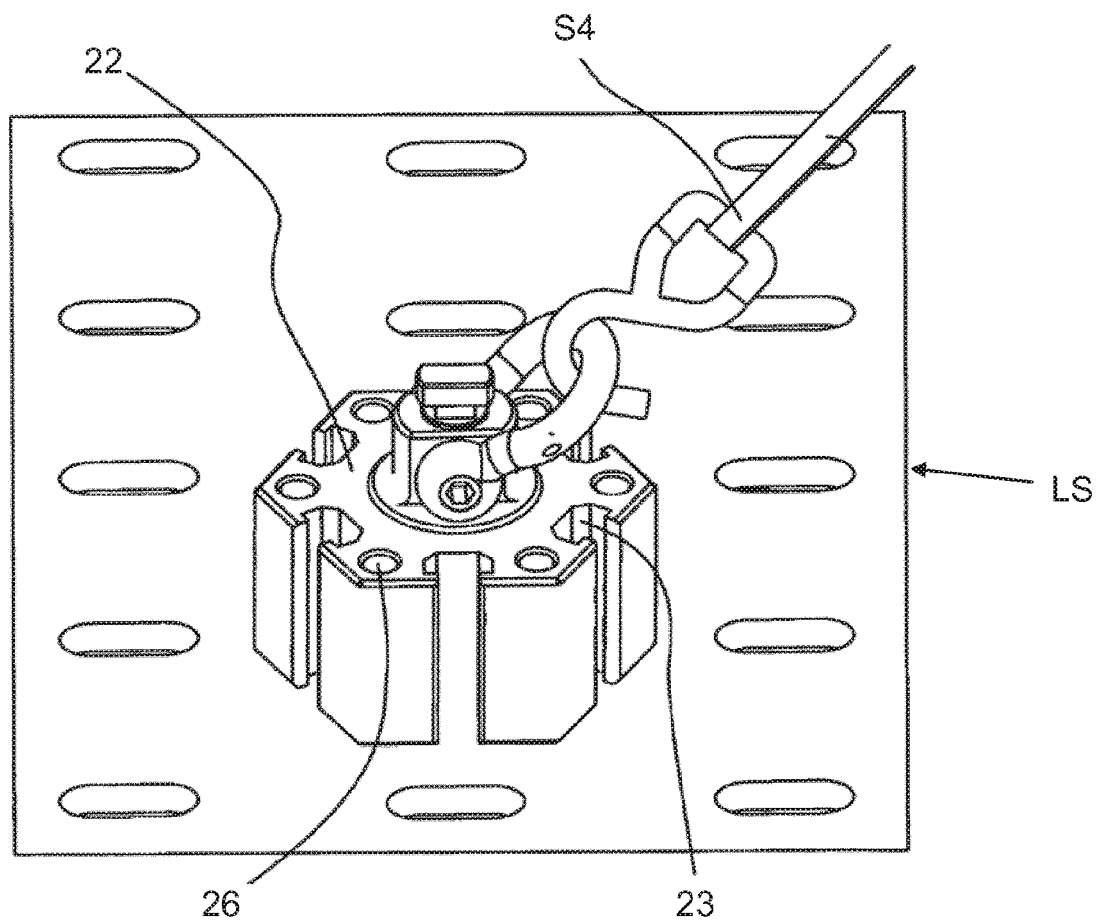
Figure 21:
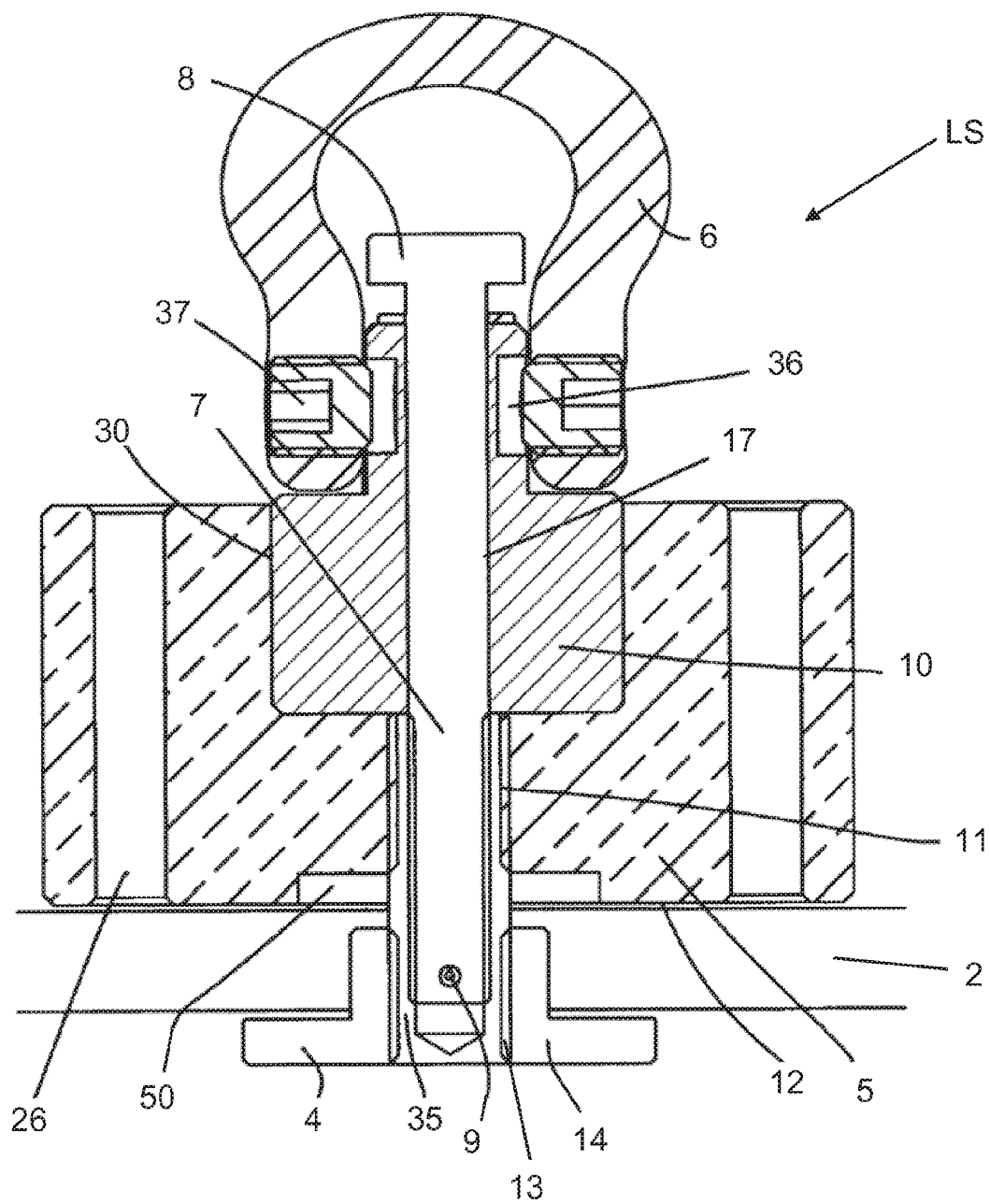
Figure 22A:
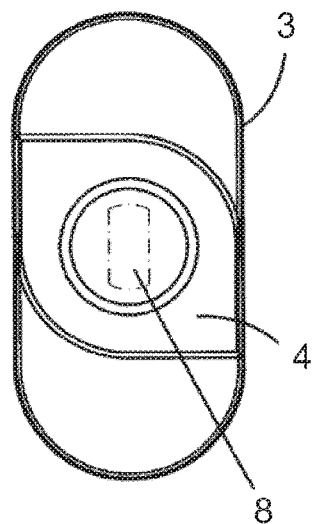
Figure 22B:
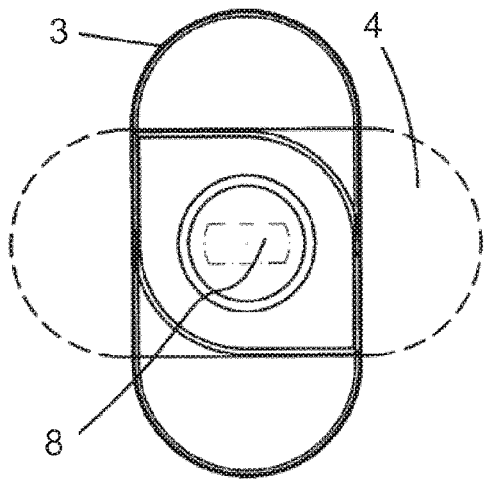
Figure 23:
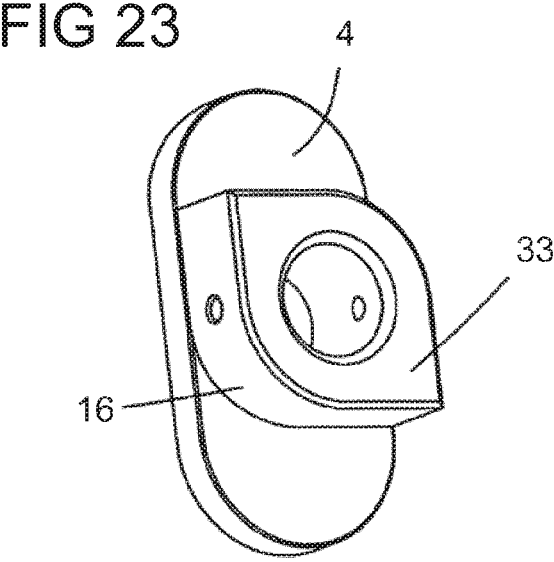

In the realization variants in FIGS. 15 to 25, the locking element 4 also comprises a centrally arranged threaded bore 13 (cf. for example FIGS. 17 and 21). In the present case, a threaded sleeve 35 engages in said threaded bore 13, in which threaded sleeve, in turn, a smaller threaded bolt with integrated display element, for example a threaded screw with a hammer head, consequently a hammer-head screw 7, engages. Said hammer-head screw is connected fixedly to the threaded sleeve 35 and fixedly to the locking element 4, in particular by means of a transverse pin 9 (cf. in particular FIGS. 17, 18 and 21). In this case, the longitudinal sides 14 of the locking element 4 and the longitudinal sides 8 of a hammer head of the hammer-head screw 7 have been moved into a parallel position prior to fixing, in particular pinning; cf. 17. The hammer-head screw 7 passes through the element body 5 and through a pivot pin 10, the element body 5 comprising a central threaded bore 11 and the pivot pin 10 a through bore 17.

The precise rotational position of the locking element 4, which is no longer visible once inserted into the opening 3 in the perforated wall because the element body 5 is arranged in front of it at the front side of the perforated wall 2, can be read from the position of the hammer head of the hammer-head screw 7 which is easily visible, as, for example, illustrated in FIGS. 15, 16 and 21.

Figure 18:
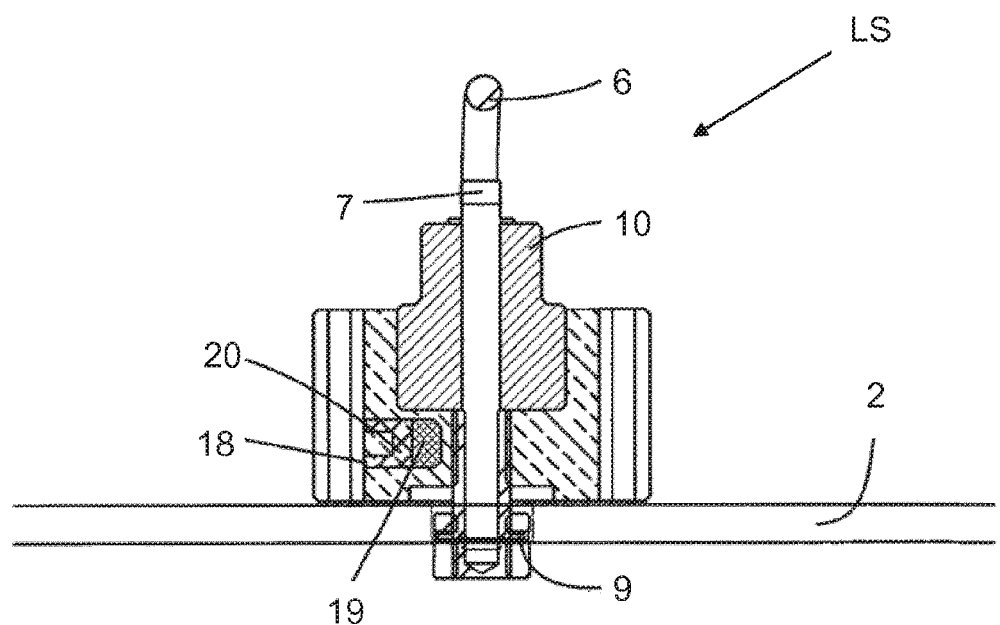
Figure 19:
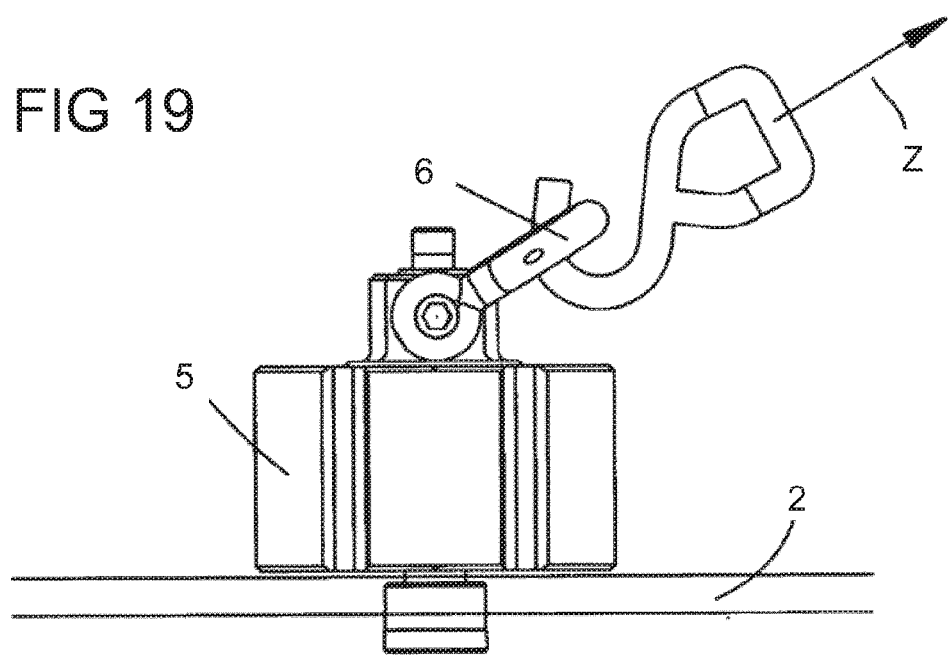

The element body 5 corresponding to FIG. 18 comprises a further threaded bore 18 which is positioned in a position transversely to the central threaded bore 11, in particular perpendicularly to the same. An elastic pressure element 19, in particular a plastic part, and a pressure screw 20 are installed in said further threaded bore 18. The elastic pressure element 19 is pressed onto the threaded bolt 7 as a result of tightening the pressing screw 20 in a variable manner and, as a result, causes the threaded sleeve 35 together with hammer-head screw 7 and consequently the locking element 4 to be entrained when the element body 5 is rotated until said locking element arrives at the longitudinal side of the opening 3 in the perforated wall. Here too, due to the eye-shaped geometry 33 of the shoulder 16, the locking element 4 has a maximum freedom of rotational movement of 90° (cf. for example FIGS. 22A and 22B). The element body 5 can be rotated further toward the perforated wall 2 as the elastic pressure element 19 presses against the threaded sleeve 35, as a result of which the rotating only acts in a stiff manner.

When an abutment surface 12 on the bottom side of the element body 5 bears against the perforated wall 2 and the locking element 4 is pressed against the rear side of the perforated wall 2, the entire fastening element 1 sits fixedly on the perforated wall 2. As a result of the shoulder 16 of the locking element 4 and of the recess 50 in the center of the abutment surface 12 of the element body 5, different thicknesses of the perforated wall 2 are additionally also balanced out in the realization variants in FIGS. 15 to 25, in particular when the thickness measurement of the perforated wall 2 is smaller than the (height) measurement of the shoulder 16 of the locking element 4. Sufficient tension can consequently always be ensured.

The element body 5 of the realization variants in FIGS. 15 to 25 can also consist of a drawn aluminum profile 22 which is provided with T grooves 23 on the sides. Further components can be fastened to said T grooves 23 for example by means of T groove slots. At the end faces, the element body 5 can also comprise hole-shaped recesses, in particular bores 26, which are parallel to the center axis and consequently to the hammer-head screw 7. Said bores 26 can be provided with thread and can consequently serve for the fastening of further components.

Figure 24:
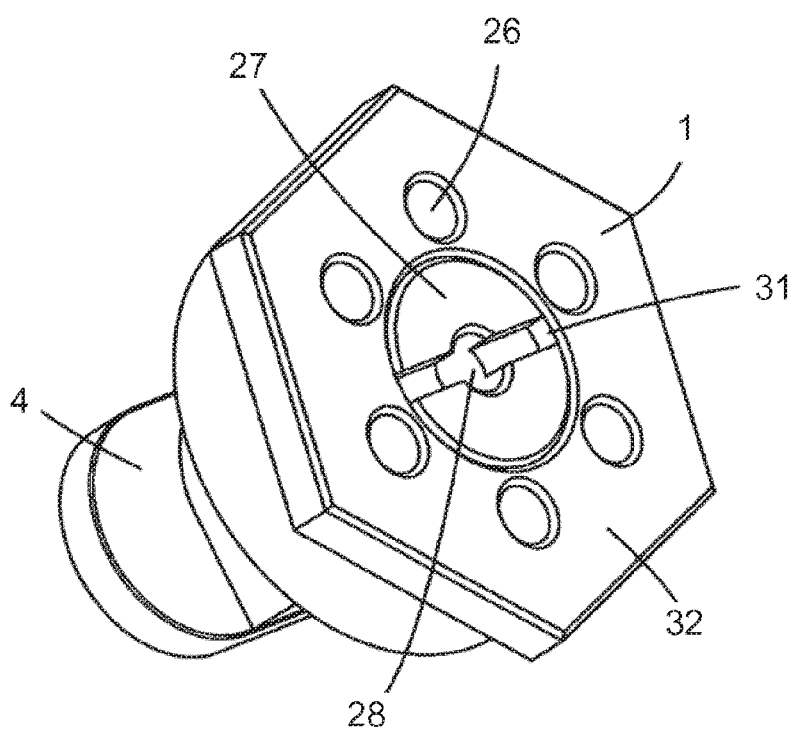

The element body 5 can also be realized in a smaller manner. FIG. 24 shows a so-called mini fastening element 1 in this connection as an example in addition to FIG. 6. The fastening element 1 in FIG. 24 also comprises (threaded) bores 26 to which all types of components can be fastened. In order to generate a continuous surface, a threaded bolt with transverse marking, in particular a slotted screw 27, is used in this case instead of a hammer-head screw 7. The slotted screw 27 is connected or pinned to the locking element 4 such that the position of a transverse marking in the form of a slot 31 of the slotted screw 27, displays the position of the locking element 4 and does not project beyond an end face 32 of the element body 5 with the bores 26. Consequently, the entire end face is available for the fastening of further attachment parts. In this case, the slotted screw 27 (or another threaded bolt with transverse marking) can comprise in the center a further fastening bore 28, where applicable also with internal thread. The display element of the locking element 4 in the form of the slotted screw 27, which displays the position of the locking element 4 at the front side, is installed here consequently in a flush-mounted manner with the end face 32 which comprises the bores 26.

The realization variants in FIGS. 15 to 25 consequently show a (safety) fastening element 1 for a perforated wall system LS, where fastening elements 1 can be introduced into openings 3 in the perforated wall, said fastening elements 1 being able to tighten a locking element 4 and an element body 5 in each case against a perforated wall 2, as a result of rotating an actuating element 6. In this connection, a fastening element comprises at least one display element, from which the actual position of the locking element 4, which is no longer visible once inserted into an opening 3 in the perforated wall, is able to be read off optically and/or haptically. The display element can be, for example, a threaded bolt with transverse marking or a hammer-head screw 7 or a slotted screw 27. As explained above, the display element can be fixedly connected to the locking element in this case (cf. in particular FIGS. 17, 18 and 21).

As explained with reference to FIGS. 17, 18 and 24, the display element can include, in particular, a threaded bolt with transverse marking in the form of a hammer-head screw 7 or a slotted screw 27. An elastic pressure element 19 can press, in this connection, in a transverse direction onto the respective thread at a force which is adjustable by means of a pressing screw 20 in order to ensure that when the element body 5 is rotated, the locking element 4 and consequently the display element are also rotated.

A ring-shaped hanging element, in particular in the form of a shackle bracket 6 which is fastened rotatably to the pivot bolt 10 with two threaded screws 37 which end in indentations 36 on the pivot bolt 10, also serves additionally in the case of the realization variants in FIGS. 15 to 25 for hanging, for example, a tensioning strap S4 or similar lashing elements (cf. in particular FIGS. 17, 20, and 21). The pivot bolt 10, in this connection, is rotatable about the hammer-head screw 7 and can consequently also adapt here to the direction from which a lashing force Z comes (cf. in particular FIGS. 19 and 20). In addition, the pivot bolt 10 is admitted in a depression 30 of the element body 5 in order to counteract lateral forces during the lashing procedure.

Figure 25:
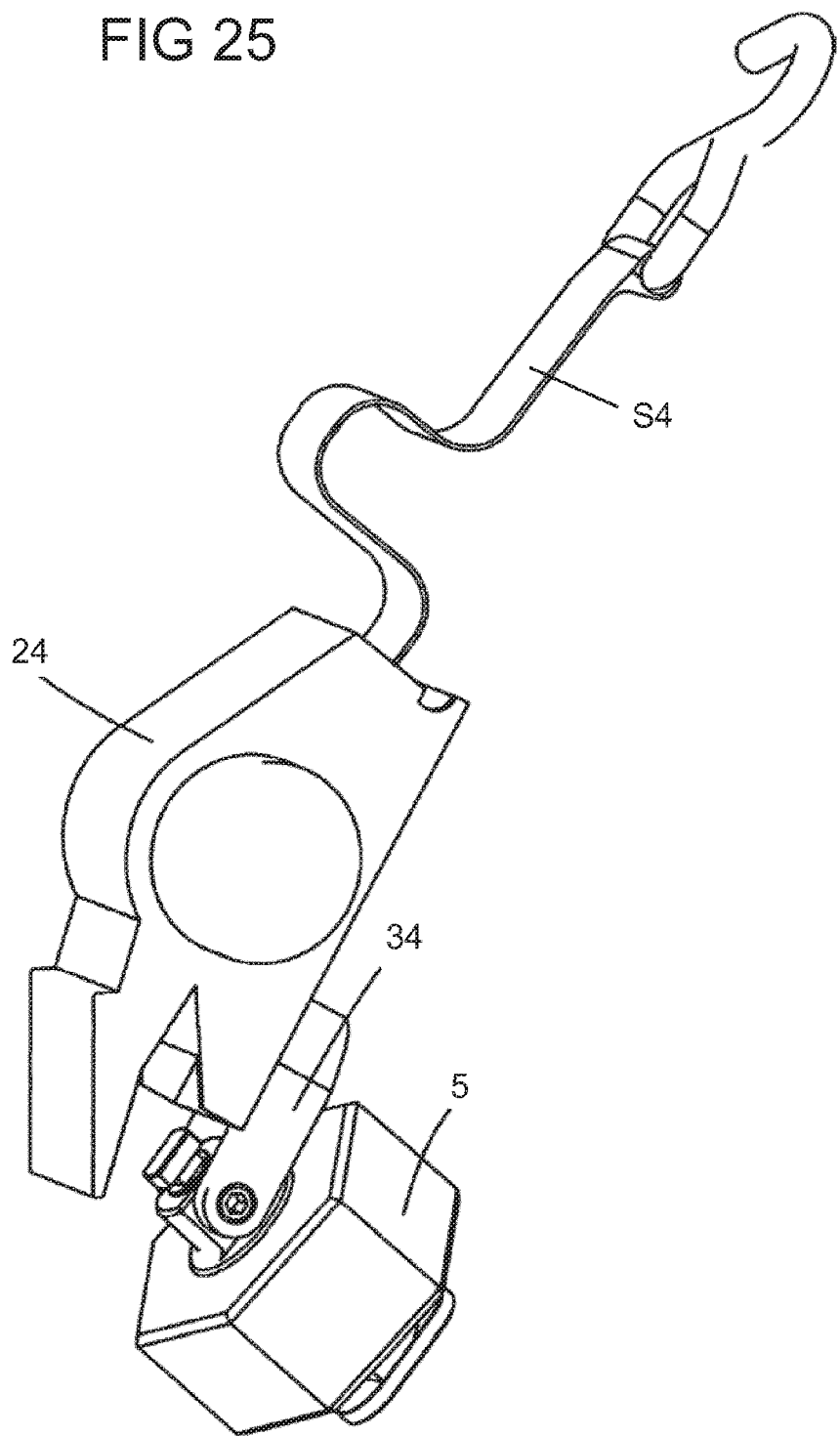

In a further development according to FIG. 25, a complete tensioning strap apparatus 24 can be attached by means of a connection piece 34 fixed to the element body 5 instead of a hanging element, such as the shackle 6. Said tensioning strap apparatus 24, together with the fastening element 1, can then form a tensioning device for perforated wall systems, a so-called strap box. Such a tensioning device for a perforated wall system LS is shown as an example in FIGS. 26 to 28 which are explained below.

Figure 26:
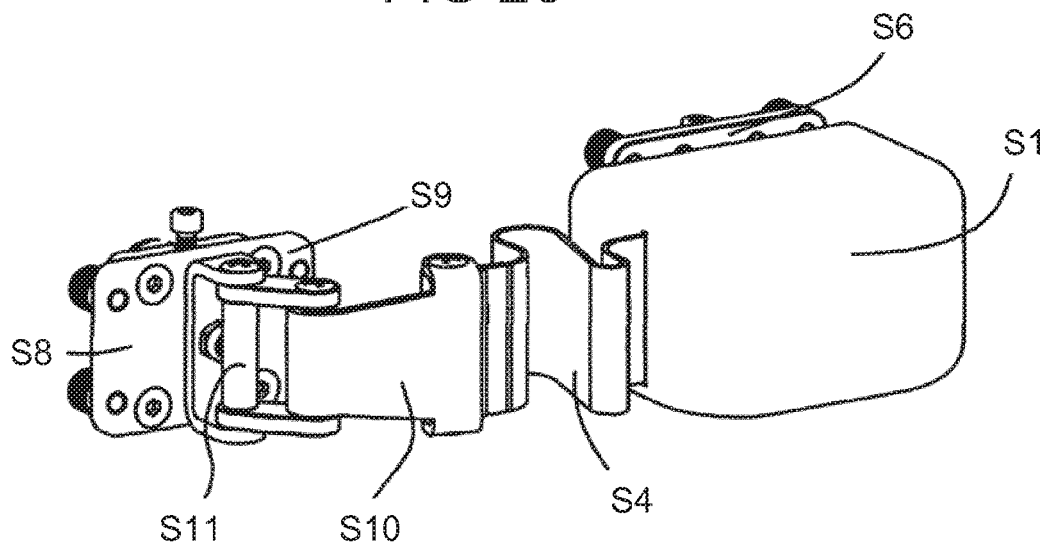
FIGS. 26 to 28 show various views of a tensioning strap apparatus for a proposed perforated wall system.
Figure 27:
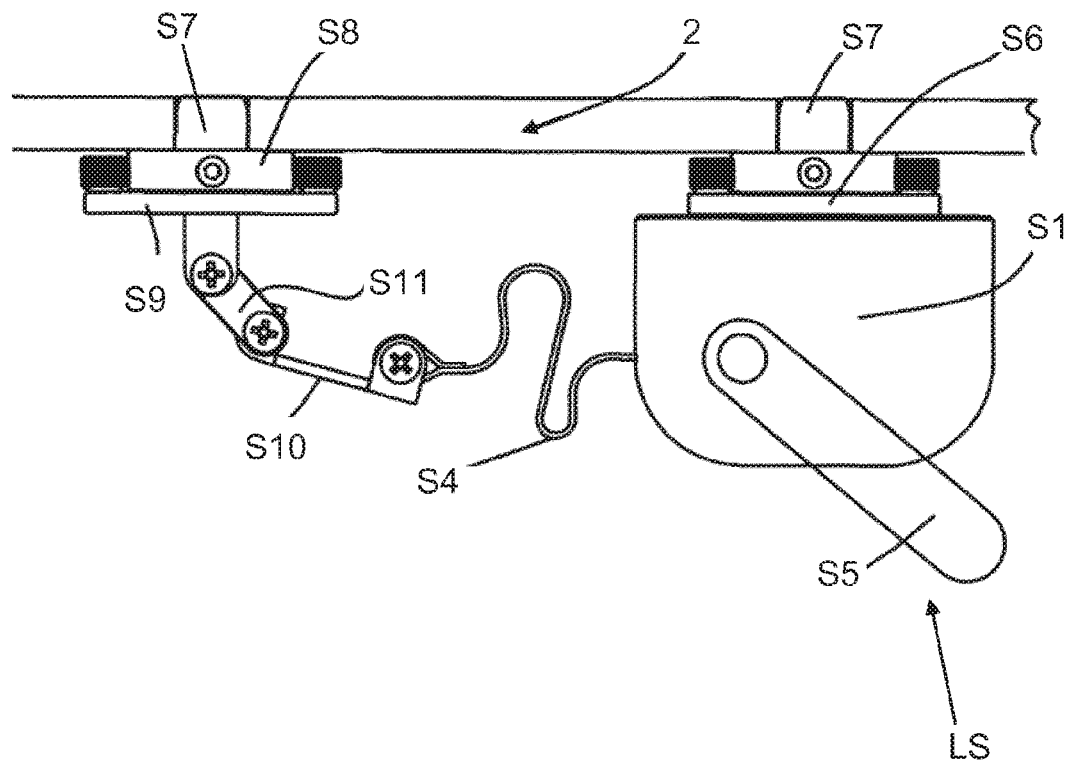
Figure 28:
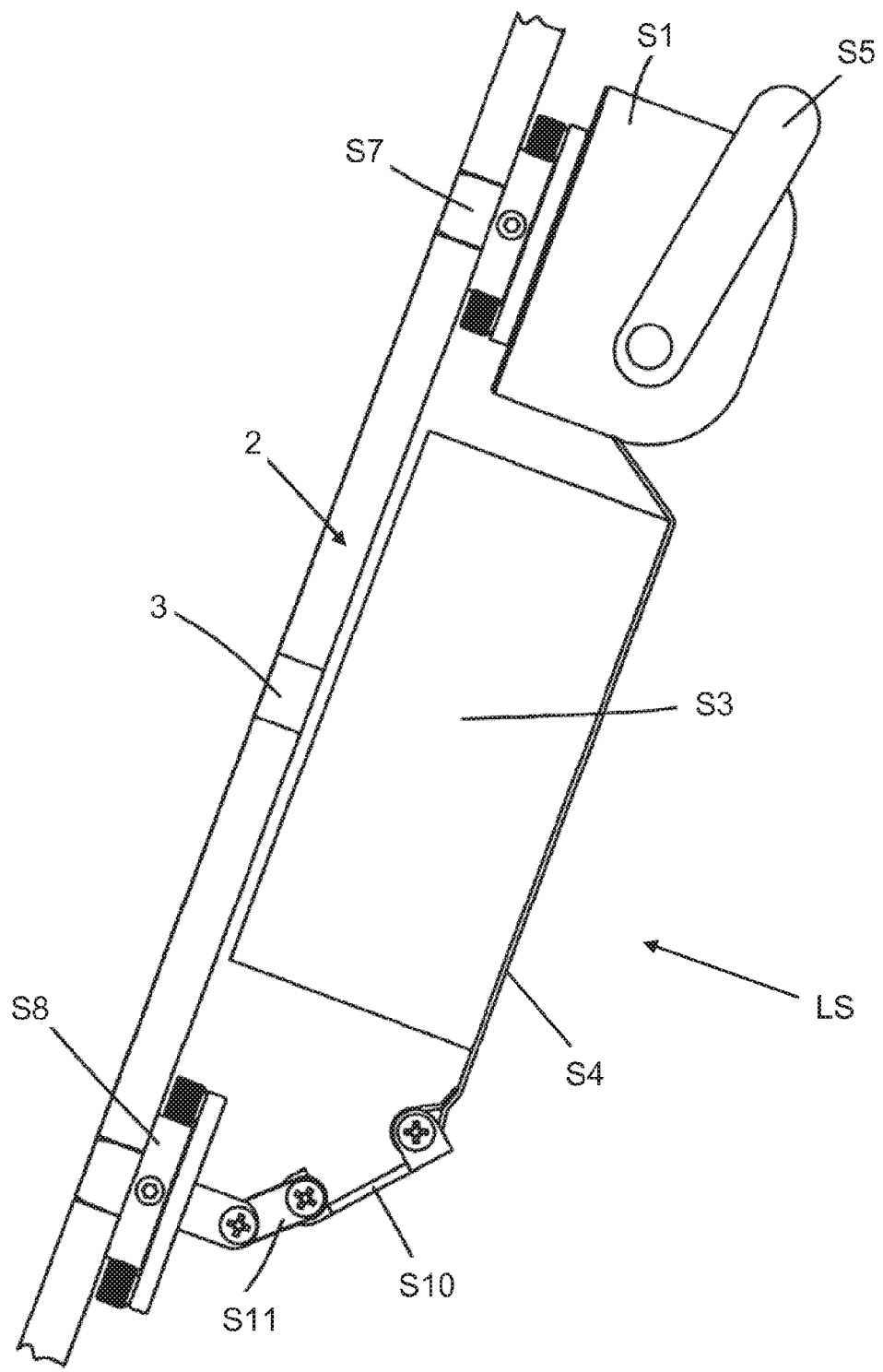

The tensioning strap apparatus S1 in FIGS. 26 to 28 for a perforated wall system LS in FIGS. 1 to 25 comprises a tensioning strap S4 with a ratchet mechanism S5 and is fixed directly on an adapter plate S6. The adapter plate S6 comprises a connection device S7 which can be connected directly to the perforated wall 2 or to a connection piece 34 of a fastening element 1.

The tensioning strap apparatus S1 can additionally include a hanging device S8 which is also fixed on an adapter plate S9 and comprises a rotatable and pivotable hanging eye S11. The hanging eye S11 makes it possible to hang the windable tensioning strap S4 in a positive locking manner by means of a hanging bracket S10. The entire tensioning device shown consequently consists of a tensioning element or tensioning strap apparatus S1 with a ratchet mechanism S5 which is fixed on an adapter plate S6, and a hanging device S8 which is fixed on an adapter plate S9. Said special tensioning device, in this case, is also called a strap box in the present case.

By means of the tensioning device, a tensioning procedure for securing transported items S3 is conceivably simple. The following few steps are to be carried out:
1. Position transported item S3 in the trunk of the transport means,
2. Position and fix tensioning strap apparatus S1 to the perforated wall 2 where applicable by means of a fastening element 1,
3. Position and fix hanging device S8 on perforated wall 2.
4. Unwind tensioning strap S4 and hang hanging bracket S10 in a positive locking manner on the hanging eye S11 and
5. Actuate ratchet mechanism S5 which tensions the tensioning strap S4 until sufficient tensioning force is present and the transported item S3 is sufficiently secured.

When relieving the tension, the tensioning strap S4 is relieved by the ratchet mechanism S5 which unhooks the hanging bracket S10 from the hanging eye S11 and rewinds the tensioning strap S4 as a result of the spring force of the ratchet mechanism S5. The transported item S3 is free again and can be removed from the transport means. The tensioning procedure can also be effected, in this connection, by using a mechanism which is driven electrically, hydraulically or purely by spring force.

When not in use, the tensioning strap apparatus S1 and the hanging device S8 can each be positioned in a space-saving manner at an arbitrary location on the perforated wall 2.

The tensioning device shown in FIGS. 26 to 28 for a perforated wall system LS which serves for securing transported items in transport means by means of tensioning straps, comprises a special tensioning element or a tensioning strap apparatus S1 which is fixed on a connection device S7, by means of which the tensioning strap apparatus S1 is able to be connected directly to any opening 3 in the perforated wall of a perforated wall 2 or to a fastening element 1. The tensioning strap apparatus S1 can be mounted, in this connection, on the connection device S7 so as to be rotatable in order to be able to tension a tensioning strap S4 in all necessary directions.

A hanging device S8, which can also be connected directly to each opening 3 in the perforated wall of a perforated wall 2 or to a fastening element 1, is additionally part of the tensioning device. The hanging device S8 can comprise, in this connection, a rotatable and/or pivotable hanging eye S11 which, in this way, is able to assume any position for the respective desired tensioning direction. The tensioning strap S4 of the tensioning strap apparatus S1 can include a hanging bracket S10 for hanging on the hanging eye S1.

LIST OF REFERENCES

1 Fastening element
10 Pivot bolt
11 Threaded bore of the element body
12 Abutment surface of the element body
13 Threaded bore
14 Longitudinal side of the locking element
16 Shoulder of the locking element
17 Through bore of the pivot bolt
18 Further threaded bore
19 Elastic pressure element
2 Perforated wall
20 Pressure screw
22 Drawn aluminum profile
23 T groove
24 Tensioning strap apparatus
26 (Threaded) bore
27 Slotted screw
28 Further bore
3 Opening in the perforated wall
30 Indentation/recess in the element body
31 Transverse marking/slot
32 End face
33 Geometry of the shoulder
34 Connection piece
35 Threaded sleeve
36 Indentation on the pivot bolt
37 Threaded screw
3L Longitudinal side of the elongated hole geometry
4 Locking element
40 Spring assembly (elastic element)
400 Plate spring
5 Element body
50 Recess
6 Actuating element (ring nut/shackle)
6A Bracket part
6B Transverse bolt
6C Support portion
7 Threaded bolt/hammer-head screw
7A Transverse pin (threaded bolt to ring nut)
7B Spring ring
8 Longitudinal side of the hammer head
9 Transverse pin
A Support surface
E Corner
Q Transverse pin (threaded bolt to element body)
R1, R2 Radius
S1 Tensioning strap apparatus
S10 Hanging bracket
S11 Hanging eye
S3 Transported item
S4 Tensioning strap
S5 Ratchet mechanism
S6 Adapter plate—tensioning belt apparatus
S7 Connection device
S8 Hanging device
S9 Adapter plate—hanging device
T Milling groove/pocket
V Reinforcement plate
Z Lashing force

The invention claimed is:

1. A perforated wall system, having
a perforated wall which comprises a front side and a rear side and multiple openings in the perforated wall and
at least one fastening element for fastening to the perforated wall,
wherein the fastening element comprises an element body accessible at the front side of the perforated wall and a locking element provided on the element body for a releasable connection of the fastening element to the perforated wall at an opening in the perforated wall,
wherein the locking element projects through the opening in the perforated wall for the fastening of the fastening element and comprises a shoulder which is received in the opening in the perforated wall and locks the locking element against rotation in the opening in the perforated wall by more than 90°,
as a result of a first rotation of the element body the locking element is rotatable until being locked by the shoulder, and
as a result of a second rotation of the element body after the first rotation,
(a) the locking element is tensionable against the rear side of the perforated wall and
(b) the element body is tensionable against the front side of the perforated wall.

2. The perforated wall system as claimed in claim 1, wherein the locking element engages behind the perforated wall at the opening in the perforated wall when the fastening element is fastened.

3. The perforated wall system as claimed in claim 1, wherein the shoulder comprises an eye-shaped cross sectional area with two oppositely situated radii and two oppositely situated corners.

4. The perforated wall system as claimed in claim 1, wherein the fastening element comprises a threaded bolt which comprises an external thread which engages with an internal thread of the locking element.

5. The perforated wall system as claimed in claim 4, wherein at least one of
the actuating element is connected to the threaded bolt,
the threaded bolt, on the one hand, is rotatable together with the locking element so that the locking element can engage behind the perforated wall at the opening in the perforated wall, and, on the other hand, is rotatable relative to the locking element in order to tension the locking element against the rear side of the perforated wall and the element body against the front side of the perforated wall, and
a spring ring which engages in a groove of the locking element and is fixed on the threaded bolt is provided, by means of which, for releasing a fastening of the fastening element at the perforated wall, the locking element, by rotating the threaded bolt, is entrained into an initial position in which the locking element can be pulled out of the opening in the perforated wall from the front side of the perforated wall.

6. The perforated wall system as claimed in claim 1, wherein at least one of the opening in the perforated wall comprises the form of an elongated hole and the locking element comprises a cross section with variously long side lengths.

7. The perforated wall system as claimed in claim 1, wherein the multiple T grooves and multiple bores are provided on the element body and T grooves and bores alternate along a circumference of the element body.

8. The perforated wall system as claimed in claim 1, wherein at least one elastic element is provided between a portion of the actuating element and a portion of the element body, in that the actuating element pretensions against the element body.

9. The perforated wall system as claimed in claim 1, wherein the fastening element comprises a display element by which the position of the locking element, which is not visible at the front side of the perforated wall after insertion into the opening in the perforated wall, is visually and/or haptically detectable at the front side of the perforated wall.

10. The perforated wall system as claimed in claim 9, wherein the display element includes a threaded bolt with transverse marking, a hammer-head screw or a slotted screw.

11. The perforated wall system as claimed in claim 1, wherein a connection piece, to which, in particular, a complete tensioning strap apparatus is fastenable, is provided on the fastening element.

12. The perforated wall system as claimed in claim 1, wherein the perforated wall system includes a tensioning strap apparatus with a windable tensioning strap.

13. The perforated wall system as claimed in claim 1, wherein the perforated wall forms at least one of part of a ceiling paneling and a wall paneling of a vehicle.

14. A perforated wall system, having
a perforated wall which comprises a front side and a rear side and multiple openings in the perforated wall and
at least one fastening element for fastening to the perforated wall,
wherein the fastening element comprises an element body and a locking element provided on the element body for a releasable connection of the fastening element to the perforated wall at an opening in the perforated wall,
wherein the locking element projects through the opening in the perforated wall for the fastening of the fastening element,
wherein at least one of as a result of an actuation of an actuating element of the fastening element accessible at the front side of the perforated wall and as a result of an actuation of the element body accessible at the front side of the perforated wall
(a) the locking element is rotatable and tensionable against the rear side of the perforated wall and
(b) the element body is tensionable against the front side of the perforated wall, and
wherein the element body comprises at least one of multiple T grooves and multiple bores for the fastening of at least one of an object and an attachment part to the element body.

15. The perforated wall system as claimed in claim 14, wherein the fastening element comprises a display element by which the position of the locking element, which is not visible at the front side of the perforated wall after insertion into the opening in the perforated wall, is visually and/or haptically detectable at the front side of the perforated wall, wherein the display element closes off in a flush-mounted manner with an end face of the fastening element on which the multiple bores are provided.

16. A perforated wall system, having
a perforated wall which comprises a front side and a rear side and multiple openings in the perforated wall and
at least one fastening element for fastening to the perforated wall,
wherein the fastening element comprises an element body and a locking element provided on the element body for a releasable connection of the fastening element to the perforated wall at an opening in the perforated wall,
wherein the locking element projects through the opening in the perforated wall for the fastening of the fastening element,
wherein at least one of as a result of an actuation of an actuating element of the fastening element accessible at the front side of the perforated wall and as a result of an actuation of the element body accessible at the front side of the perforated wall
(a) the locking element is rotatable and tensionable against the rear side of the perforated wall and
(b) the element body is tensionable against the front side of the perforated wall, and
wherein at least one of
the element body comprises, on a bottom side facing the perforated wall, a recess at which the locking element protrudes from the element body, and
the actuating element comprises a bracket part.

17. A perforated wall system, having
a perforated wall which comprises a front side and a rear side and multiple openings in the perforated wall and
at least one fastening element for fastening to the perforated wall,
wherein the fastening element comprises an element body and a locking element provided on the element body for a releasable connection of the fastening element to the perforated wall at an opening in the perforated wall,
wherein the locking element projects through the opening in the perforated wall for the fastening of the fastening element,
wherein at least one of as a result of an actuation of an actuating element of the fastening element accessible at the front side of the perforated wall and as a result of an actuation of the element body accessible at the front side of the perforated wall
(a) the locking element is rotatable and tensionable against the rear side of the perforated wall and
(b) the element body is tensionable against the front side of the perforated wall, and
wherein the fastening element comprises a threaded bolt which comprises an external thread which engages with an internal thread of the locking element, and the fastening element comprises a display element by which the position of the locking element, which is not visible at the front side of the perforated wall after insertion into the opening in the perforated wall, is visually and/or haptically detectable at the front side of the perforated wall, and wherein an elastic pressure element is provided on the element body which presses in a transverse direction, which extends transversely to a longitudinal extension direction of the threaded bolt, onto an external thread of the threaded bolt in order to ensure that when the element body is rotated, the locking element and the display element are rotated.

18. A fastening element for fastening to a perforated wall having an element body and a locking element provided on the element body and protruding from a bottom side of the element body for releasably connecting the fastening element to the perforated wall at an opening in the perforated wall,
wherein the locking element is set up, for the fastening of the fastening element, to project through the opening in the perforated wall to protrude from a rear side of the perforated wall,
wherein at least one of by an actuation of an actuating element of the fastening element accessible at a front side of the fastening element and by an actuation of the element body (a) the locking element is rotatable and tensionable against a rear side of the perforated wall and
(b) the element body is tensionable against the front side of the perforated wall, and
wherein the element body comprises at least one of multiple T grooves and multiple bores for the fastening of at least one of an object and an attachment part to the element body.

19. The fastening element as claimed in claim 18, wherein the fastening element is provided on the perforated wall for fastening at least one of a bracket part, a tensioning belt apparatus and a fitment.

20. A fastening element for fastening to a perforated wall having an element body and a locking element provided on the element body and protruding from a bottom side of the element body for releasably connecting the fastening element to the perforated wall at an opening in the perforated wall,
wherein the locking element is set up, for the fastening of the fastening element, to project through the opening in the perforated wall to protrude from a rear side of the perforated wall,
wherein at least one of by an actuation of an actuating element of the fastening element accessible at a front side of the fastening element and by an actuation of the element body
(a) the locking element is rotatable and tensionable against a rear side of the perforated wall and
(b) the element body is tensionable against the front side of the perforated wall, and
wherein at least one of
the element body comprises, on a bottom side facing the perforated wall, a recess at which the locking element protrudes from the element body, and
the actuating element comprises a bracket part.

21. A fastening element for fastening to a perforated wall having an element body and a locking element provided on the element body and protruding from a bottom side of the element body for releasably connecting the fastening element to the perforated wall at an opening in the perforated wall,
wherein the locking element is set up, for the fastening of the fastening element, to project through the opening in the perforated wall to protrude from a rear side of the perforated wall,
wherein at least one of by an actuation of an actuating element of the fastening element accessible at a front side of the fastening element and by an actuation of the element body
(a) the locking element is rotatable and tensionable against a rear side of the perforated wall and
(b) the element body is tensionable against the front side of the perforated wall, and
wherein the fastening element comprises a threaded bolt which comprises an external thread which engages with an internal thread of the locking element, and the fastening element comprises a display element by which the position of the locking element, which is not visible at the front side of the perforated wall after insertion into the opening in the perforated wall, is visually and/or haptically detectable at the front side of the perforated wall, wherein an elastic pressure element is provided on the element body which presses in a transverse direction, which extends transversely to a longitudinal extension direction of the threaded bolt, onto an external thread of the threaded bolt in order to ensure that when the element body is rotated, the locking element and the display element are rotated.

\* \* \* \* \*